US010599268B2

(12) United States Patent
Nathan et al.

(10) Patent No.: US 10,599,268 B2
(45) Date of Patent: *Mar. 24, 2020

(54) TOUCHSCREEN PANEL SIGNAL PROCESSING

(71) Applicant: Cambridge Touch Technologies Ltd., Cambridge (GB)

(72) Inventors: Arokia Nathan, Cambridge (GB); Jackson Lai, Markham (CA); Shuo Gao, Cambridge (GB)

(73) Assignee: Cambridge Touch Technologies Ltd., Cambridge (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/357,932

(22) Filed: Mar. 19, 2019

(65) Prior Publication Data
US 2019/0212874 A1    Jul. 11, 2019

Related U.S. Application Data

(63) Continuation of application No. 15/421,648, filed on Feb. 1, 2017, now Pat. No. 10,289,247.

(30) Foreign Application Priority Data

Feb. 5, 2016 (GB) .................................. 1602124.8

(51) Int. Cl.
G06F 3/041 (2006.01)
G06F 1/3234 (2019.01)
G06F 3/044 (2006.01)

(52) U.S. Cl.
CPC .......... G06F 3/0418 (2013.01); G06F 1/3262 (2013.01); G06F 3/044 (2013.01); G06F 3/0416 (2013.01)

(58) Field of Classification Search
CPC ...... G06F 3/0418; G06F 3/0416; G06F 3/044; G06F 1/3262
See application file for complete search history.

(56) References Cited

U.S. PATENT DOCUMENTS

| 2008/0309624 | A1* | 12/2008 | Hotelling | G06F 3/04883 345/173 |
| 2009/0066665 | A1* | 3/2009 | Lee | G06F 3/044 345/173 |
| 2010/0007631 | A1* | 1/2010 | Chang | G06F 3/044 345/174 |
| 2014/0043287 | A1* | 2/2014 | Nakajima | G06F 3/0418 345/174 |

(Continued)

Primary Examiner — Ariel A Balaoing

(57) ABSTRACT

A method for processing signals from a touchscreen panel includes obtaining a partial frame by sampling parts of a frame from a touch panel which comprises an array of sensor areas (step S1). The method also includes generating, based on the partial frame, a new frame which comprises estimates of the un-sampled parts (step S2). The method also includes determining whether at least one touch event is present in the new frame (step S3), and upon a positive determination, for each touch event, determining a location of the touch event in the new frame and obtaining a sub-frame by sampling a region of a subsequent frame from the touch panel frame at and around the location (step S4). The method also includes outputting touch information based on one or more sub-frames (step S7).

17 Claims, 17 Drawing Sheets

(56) References Cited

U.S. PATENT DOCUMENTS

| | | | |
|---|---|---|---|
| 2015/0130747 A1* | 5/2015 | Tsai | G06F 3/0412 345/174 |
| 2015/0234446 A1* | 8/2015 | Nathan | G06F 1/3262 345/174 |
| 2016/0162011 A1* | 6/2016 | Verma | G06F 3/0416 345/173 |
| 2016/0162102 A1* | 6/2016 | Shahparnia | G06F 3/0416 345/174 |

* cited by examiner

| Parameter | Unit | Value |
|---|---|---|
| Diagonal | Inch | 10.1 |
| Aspect Ratio | None | 16/9 |
| Excitation Voltage | Volt | 10 |
| Display Pixel Size | (Micrometer)$^2$ | 56×56 |
| TX Electrode Size | Millimeter | 3 |
| RX Electrode Size | Micrometer | 449 |
| Refreshing rate | Hertz | 60 |
| Sensing Array Size | (Millimeter)$^2$ | 3×3 |
| Sensing Array Spacing | Millimeter | 2 |

Fig. 20

| $f_{samp}$ | $N_{down}$ | $N_{reg}$ |
|---|---|---|
| 10 % | 640 | 121 |
| 30 % | 1920 | 81 |
| 50 % | 3200 | 49 |

Fig. 21

| Parameter | $F_{full}$ | $F_{down}$ | $F_{zero}$ | $F_{LPSF}$ | $F_{reg}$ |
|---|---|---|---|---|---|
| Resolution | 80 × 80 | 40 × 40 | 80 × 80 | 80 × 80 | 80 × 80 |
| Shape recognition | Good | Good | Bad | Good | - |
| Noise spike attenuation | None | None | None | Good | Varies |
| Detection accuracy | Medium | Low | Low | Low | High |
| Power consumption | High | Low | Low | Low | Low |
| Acquisition rate | Low | High | High | High | High |

Fig. 22

TOUCHSCREEN PANEL SIGNAL PROCESSING

CROSS-REFERENCE TO RELATED APPLICATIONS

The present application is a Continuation of application Ser. No. 15/421,648, filed on Feb. 1, 2017, which claims priority from United Kingdom Application GB 1602124.8, filed Feb. 5, 2016, the benefit of priority of each of these applications is claimed hereby, and each is incorporated by reference herein in its entirety.

FIELD OF THE INVENTION

The present invention relates to touchscreen panel signal processing.

BACKGROUND

Touchscreen panels (TSPs) are widely used in consumer electronic devices. Resistive and capacitive touchscreen panels have been widely adopted as input means for data processing devices, in particular for mobile devices such as smartphones, tablet computers and laptops. There is also growing interest in pressure sensing touchscreen panels, for example as described in US 2014/0008203 A1.

Regardless of the specific parameter(s) measured by a touchscreen panel to detect user inputs, three parameters which influence user experience are: power consumption, detection accuracy and responsivity. Power consumption influences the battery life-time of a mobile device including the touchscreen panel. Detection accuracy is important for efficient human-machine interactivity. High responsivity is significant for real-time applications. A factor related to all three parameters is the number of measured touch sensor areas. Touchscreen panels are commonly arranged to record user interactions or touch events using sensor areas arranged in a two-dimensional array or sensor areas provided by the intersections of a two-dimensional grid of electrodes. When fewer sensors are read, higher responsivity is obtained, and less power consumption is required. However, the resolution is reduced.

As used herein, the term "touch event" should cover a user interacting with a touchscreen by touching or pressing the touchscreen panel using a digit/finger or a suitable stylus. The signals output from a touchscreen panel having a two dimensional array or grid arrangement of sensor areas are collated into a corresponding array or frame. Such a frame may be presented as an image to help visualise the output signals from a touchscreen panel as a whole, with each pixel value of the frame corresponding to a signal level of a corresponding sensor area of the touchscreen panel.

For example, referring to FIG. 1, a full resolution frame $F_{full}$ may be acquired using the maximum resolution possible for a given touchscreen panel. In grayscale plots illustrating frames, regions labelled "LG" correspond to low signal levels, regions labelled "DG" correspond to intermediate signal levels and regions labelled "B" correspond to high signal level.

Alternatively, a down-sampled, or partial, frame $F_{down}$ may be acquired by sampling a subset of the available sensor areas, for example, a quarter (0.25) of the available sensor areas. Down-sampling the number of sensor areas may decrease power consumption and increase the speed of acquiring a touch signal frame, i.e. reduce the interval between acquiring successive frames. However, the resolution is decreased, which may result in reduced detection accuracy of touch events and/or errors in registering touch events.

In an ideal touchscreen panel, the signal frames $F_{full}$, $F_{down}$ would register zero everywhere except at the locations of touch events. However, in practice, even when a two-dimensional array or grid of touch sensor areas is sampled in the absence of any touch event, almost all of the values acquired will be non-zero values corresponding to noise signals or offset values (e.g. DC or slowly varying). The value from each touch sensor area corresponds to a location or pixel value of the signal frame $F_{full}$, $F_{down}$. Consequently, signals resulting from touch events must be large enough to overcome such noise signals and offset values, which may require relatively larger excitation voltages to be used for accurate detection of touch events. High excitation voltages for acquiring a signal frame from a touchscreen panel contribute to increased power consumption.

SUMMARY

The present invention seeks to provide improved processing of output signals from a touch panel. The present invention seeks to provide improved methods for decreasing the power required and/or the time taken to acquire output signals from a touch panel whilst maintaining or improving the detection accuracy.

According to a first aspect of the invention there is provided a method including obtaining a partial frame by sampling parts of a frame from a touch panel which comprises an array of sensor areas. The method also includes generating, based on the partial frame, a new frame which comprises estimates of the un-sampled parts. The method also includes determining whether at least one touch event is present in the new frame, and upon a positive determination, for each touch event, determining a location of the touch event in the new frame and obtaining a sub-frame by sampling a region of a subsequent frame from the touch panel frame at and around the location. The method also includes outputting touch information based on one or more sub-frames.

Thus, energy consumption may be reduced by reducing a total number of sensor areas which are sampled, whilst detection accuracy may be maintained by obtaining a sub-frame by sampling a region of a subsequent frame at and around the location. When sensor areas are sampled sequentially, responsivity of a touch panel system may also be improved by reducing the number of sensor areas sampled.

A region for a sub-frame may be centred on the location. When the location is located at or near a boundary of the array of sensor areas, a region for a sub-frame may have different dimensions than when the location is not at or near a boundary of the array of sensor areas.

The partial frame may be obtained by sampling some of the sensor areas which are selected at random based on a sampling fraction. The sampling fraction may be a percentage. The sampling fraction may be at least 10%, at least 20%, at least 25%, at least 40%, at least 50%, at least 75% or more. The sampling fraction may be a fraction having a numerator of one and a denominator between two and sixteen. Selection at random may include generating pseudo-random numbers. Sampled sensor areas may be randomly selected each time a partial frame is obtained. Sensor areas sampled for obtaining a partial frame may be randomly selected upon start-up of the touch panel. Sensor areas sampled for obtaining the partial frame may be randomly selected according to a pre-determined schedule.

Rows and columns of the array may be selected at random based on the sampling fraction and the sampled sensor areas may correspond to intersections of the selected rows and columns.

The partial frame may be obtained by sampling a fraction of the array of sensor areas equal to a sampling fraction.

The partial frame may be obtained by sampling a predetermined pattern of sensor areas which is selected in dependence upon a sampling fraction.

The size of a region for obtaining each sub-frame may be dependent on the sampling fraction.

The method may further include, for each touch event, determining a second location based on the sub-frame, determining if a difference between the location and the second location exceeds a threshold amount, and upon a positive determination, obtaining an additional sub-frame by sampling a region of a subsequent frame from the touch panel frame at and around the second location. The touch information may be based on one or more sub-frames and any additional sub-frames.

The sampling fraction may be fixed. The sampling fraction may be changed when a condition becomes satisfied. The sampling fraction may be changed when a condition ceases to be satisfied. A condition to be satisfied may include a condition on the quality of the new frame. A condition to be satisfied may include a condition on a difference between the location(s) determined based on the new frame and second location(s) determined based on the sub-frame(s). Sensor areas sampled for obtaining partial frame may be randomly selected in response to a change in the sampling fraction.

The method may further include, for each touch event, obtaining one or more additional sub-frames by sampling a region of a subsequent frame from the touch panel frame at and around the location and generating an averaged sub-frame by averaging the sub-frame and the additional sub-frame(s). The touch information may be based on one or more averaged sub-frames.

Thus, detection accuracy may be improved by reducing signal-to-noise ratio whilst also reducing energy consumption of a touchscreen system. When sensor areas are sampled sequentially, the responsivity may also be increased.

The method may further include generating a corrected partial frame by subtracting a reference partial frame from the partial frame and, upon a negative determination of the presence of one or more touch events, generating a new reference partial frame based on exponential smoothing of the reference partial frame and the partial frame using a weighting factor, and storing the new reference partial frame. The new frame may be generated using the corrected partial frame.

Thus, detection accuracy may be further improved by reducing or removing offset values of the sensor areas. The reduction or removal of offset values may also decrease high frequency content of the touch signals and improve quality of a new frame generated.

The weighting factor may be zero.

The new frame may be generated by generating an intermediate frame and setting a value stored for each location of the intermediate frame according to, in dependence upon the location is a sampled location, a corresponding value is inserted from the partial frame or the corrected partial frame, and in dependence upon the location is an un-sampled location, a corresponding value is set to zero, and generating the new frame by filtering the intermediate frame using a spatial low-pass filter having a bandwidth.

Thus, detection accuracy may be further improved by relatively attenuating noise spikes and/or high spatial frequency artefacts arising from signal reconstruction with respect to low spatial frequency touch signals.

The spatial low-pass filter may be linear or non-linear. The spatial low-pass filter may be an average filter. The spatial low-pass filter may a Gaussian filter. The bandwidth and/or coefficients of the spatial low-pass filter may be determined in dependence upon the sampling fraction.

The method may further include setting the bandwidth of the spatial low-pass filter in dependence upon the sampling fraction.

The new frame may be generated by applying a compressive sensing algorithm to the partial frame or the corrected partial frame. The compressive sensing algorithm may be a minimum $\ell_1$ norm method.

The method may further include filtering the new frame using a spatial low-pass filter having a bandwidth before determining the presence of one or more touch events in dependence thereupon.

The spatial low-pass filter may be linear or non-linear. The spatial low-pass filter may be an average filter. The spatial low-pass filter may a Gaussian filter. The bandwidth and/or coefficients of the spatial low-pass filter may be determined in dependence upon the sampling fraction.

In dependence upon a location of the new frame being a sampled location, a value stored for that location may be equal to a corresponding value from the partial frame.

Each sensor area of the touch panel may measure capacitance. Each sensor area of the touch panel may measure force applied proximate to that sensor area. Each sensor area of the touch panel may measure capacitance and force applied proximate to that sensor area.

The method may further include sampling some sensor areas from a touch panel which comprises an array of sensor areas.

According to a second aspect of the invention there is provided a computer program stored on a computer readable medium which, when executed by a data processing unit, causes the data processing unit to execute the method.

According to a third aspect of the invention there is provided a computer program product stored on a non-transitory computer readable medium which, when executed by a data processing unit, causes the data processing unit to execute the method.

According to a fourth aspect of the invention there is provided apparatus configured to carry out the method.

According to a fifth aspect of the invention there is provided apparatus including a frame acquisition module configured to obtain a partial frame by sampling parts of a frame from a touch panel which comprises an array of sensor areas. The apparatus also includes a signal reconstruction module configured to generate, based on the partial frame, a new frame which comprises estimates of the un-sampled parts. The apparatus also includes a touch decision module configured to determine whether at least one touch event is present in the new frame and to determine a location for each touch event so determined. The apparatus also includes a sub-frame acquisition module configured to, for each touch event determined by the touch decision module, obtain a regional sub-frame by sampling a region of a subsequent frame from the touch panel frame at and around the location. The apparatus also includes a communications module configured to output touch information based on one or more regional sub-frames.

According to a sixth aspect of the invention there is provided a touch panel system including a touch panel including a plurality of sensor areas disposed in a sensor array, each sensor area configured to provide an output signal which varies in response to a touch event, and the apparatus.

BRIEF DESCRIPTION OF THE DRAWINGS

Certain embodiments of the present invention will now be described, by way of example, with reference to the accompanying drawings in which:

FIGS. 13A and 13B illustrate the application of spatial low-pass filter masks to arrays of values sampled from an array of touch panel sensor areas;

FIG. 20 illustrates the properties of an experimental capacitive test bed used to evaluate the first and second methods of processing output signals from a touchscreen panel;

FIG. 21 illustrates parameters of a first method of processing output signals from a touchscreen panel evaluated using the experimental capacitive test bed illustrated in FIG. 20; and FIG. 22 illustrates parameters of a second method of processing output signals from a touchscreen panel evaluated using the experimental capacitive test bed illustrated in FIG. 20.

DETAILED DESCRIPTION OF CERTAIN EMBODIMENTS

Figure 1:
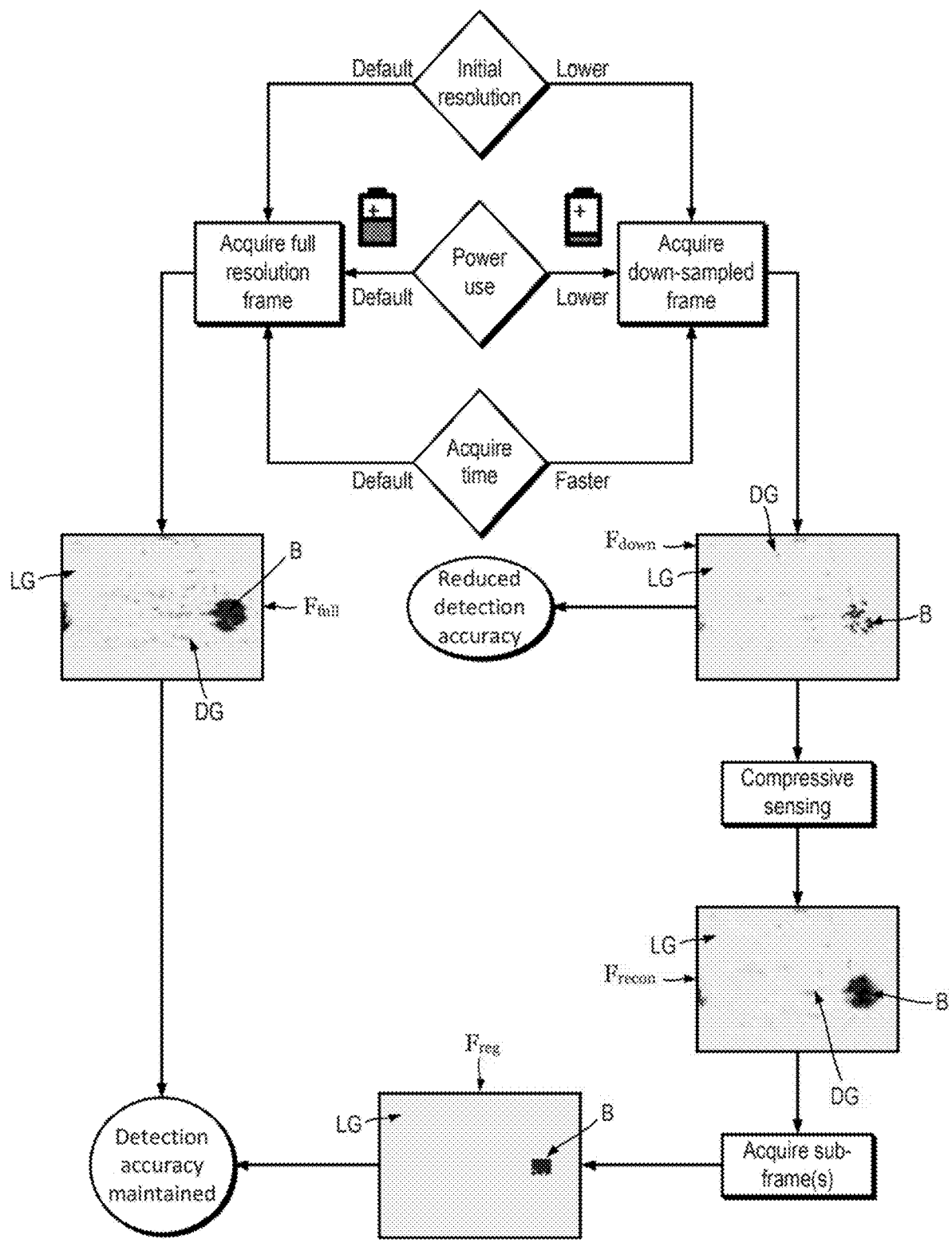
FIG. 1 illustrates down-sampling and reconstruction of output signals from a touchscreen panel using compressive sensing methods.

In the following description, like parts are denoted by like reference numerals.

As used herein, the term "touch event" should cover a user interacting with a touchscreen by touching or pressing the touchscreen panel using a digit/finger or a suitable stylus. The signals output from a touchscreen panel having a two dimensional array or grid arrangement of sensor areas may be collated into a corresponding array or touch signal frame. Such a frame may be presented as an image to help visualise the output signals from a touchscreen panel as a whole. Each "pixel" of a frame contains a value corresponding to the signal level sampled from a corresponding sensor area of a touchscreen panel. Touchscreen signal frames may be single touch signal frames $F_{single}$ or multi-touch signal frames $F_{multi}$. The term "single-touch" should cover a user interaction in which a single digit of a user, or a single suitable stylus touches or presses the touchscreen panel. The term "multi-touch" should cover a user interaction in which two or more digits of a user, or two or more suitable styluses, or a combination of a user's digits and a stylus, touch or press the touchscreen panel concurrently. Touchscreen frames may be no-touch frames or reference frames $F_0$, in which the read-out values correspond substantially to background noise signals and/or offset values.

Figure 2:
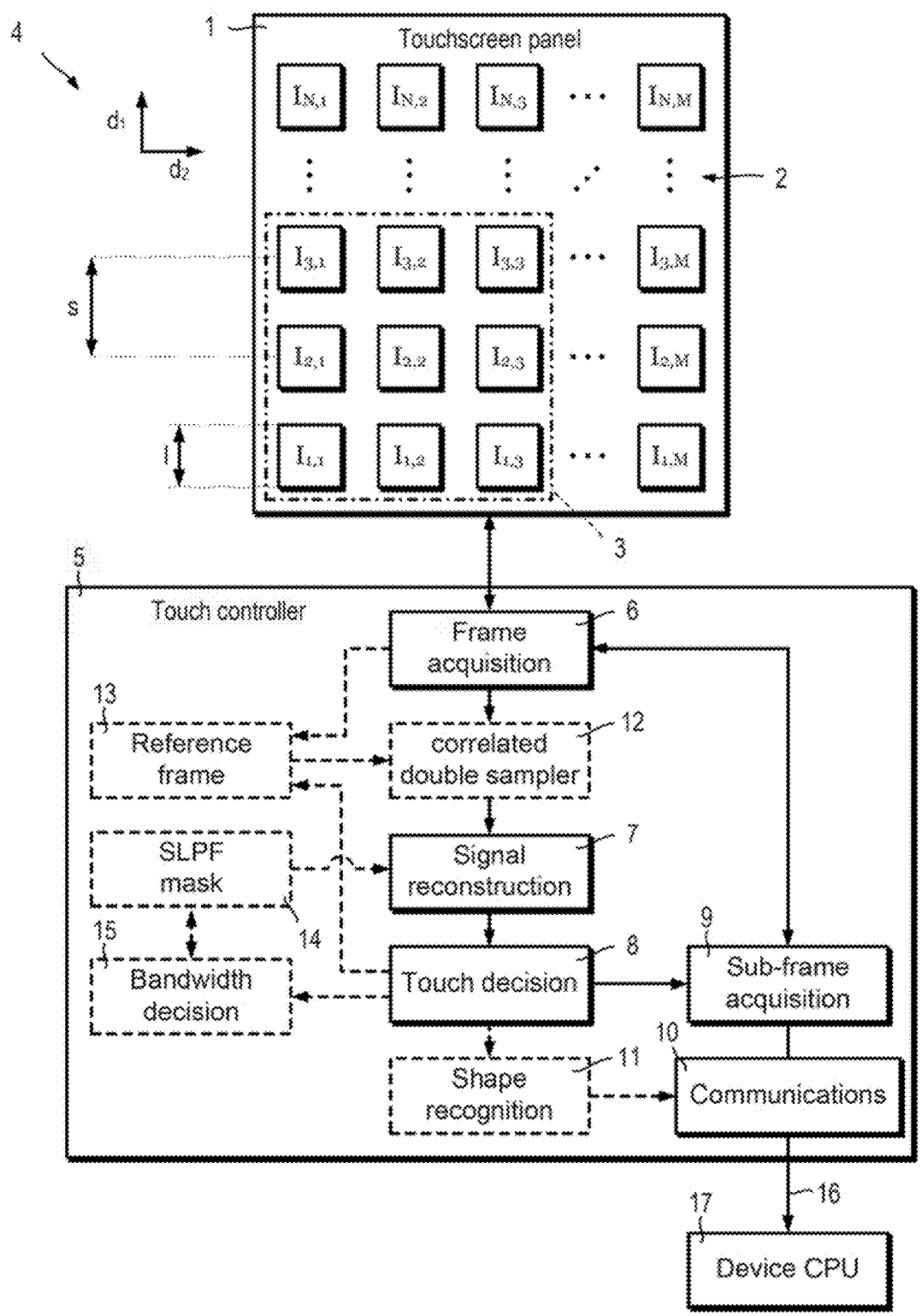
FIG. 2 is a block diagram of a touchscreen system including a touchscreen panel having an array of touch panel sensor areas.

Compressive Reconstruction of Output Signals From a Touchscreen Panel:

Referring to FIGS. 1 and 2, output signals from a touchscreen panel 1 having an array 2 of sensor areas $I_{n,m}$ may be processed using compressive sensing methods to reduce the energy consumption for obtaining touch event information whilst maintaining or even improving detection accuracy.

A down-sampled, or partial, frame $F_{down}$ is acquired by sampling, or measuring, touch signals from a fraction of the total number of sensor areas $I_{n,m}$ included the array 2, for example, the sampling fraction may be 30% of the total number of sensing areas $I_{n,m}$. Selection of which sensor areas $I_{n,m}$ to sample when acquiring the down-sampled frame $F_{down}$ may be random. Alternatively, selection of which sensor areas to sample when acquiring the down-sampled frame $F_{down}$ may be systematic, for example sampling every other row and column of the array 2 or sampling every third row and column of the array 2. Down-sampled frames $F_{down}$ may take the form of an array having the original resolution and assign a value of zero to pixels corresponding to un-sampled sensor areas $I_{n,m}$. Alternatively, down-sampled frames $F_{down}$ may take the form of a listing of coordinates of sampled sensor areas $I_{n,m}$ and the corresponding sampled values. Alternatively, when the sensor areas $I_{n,m}$ for acquiring the down-sampled frames $F_{down}$ are selected systematically the down-sampled frame $F_{down}$ may take the form of an array having reduced resolution. For example, if every other row and column are sampled, then the down-sampled frame will have half the original resolution.

In some touchscreen panels 1, the sensor areas $I_{n,m}$ may be sampled sequentially. In such touchscreen panels, sampling each sensor area $I_{n,m}$ has an associated time interval, $\delta t$, such that acquiring a down-sampled frame $F_{down}$ will be faster than acquiring a full resolution frame $F_{full}$ because fewer sensor areas $I_{n,m}$ need to be sampled. Other touchscreen panels 1 may allow each sensor area Top to be sampled substantially simultaneously, for example, if each sensor area $I_{n,m}$ is a discrete sensor. When simultaneous sampling of the sensor areas $I_{n,m}$ is possible, acquiring a down-sampled frame $F_{down}$ may not substantially reduce the acquisition time. However, because sampling a sensor area $I_{n,m}$ also has an associated energy cost $\delta E$, acquiring a down-sampled frame $F_{down}$ will reduce energy consumption compared to a full resolution frame $F_{full}$ whether signals from the sensor areas are sampled sequentially or simultaneously.

Responsivity of a touchscreen panel 1, which depends partly on the acquisition time of touch signal frames, should be faster than a threshold level of user perceptibility in order to ensure that a user does not perceive a delay or lag between an input and a response. The acquisition time should also be short enough that details of a user interaction are not lost, for example, to ensure short taps do not fail to register or that the shape of a curve or line traced by a user is registered accurately. Equally, improvements in responsivity substantially in excess of a threshold of user perceptibility may become unnoticeable to a user. By contrast, reductions in energy consumption will generally increase the length of time for which a device incorporating a touchscreen panel 1 may be operated on battery power before re-charging or replacement of the battery.

The down-sampled, or partial, frame $F_{down}$ may be acquired using less energy than a full resolution frame $F_{full}$. Where sampling of sensor areas $I_{n,m}$ is sequential, the down-sampled frame $F_{down}$ may also be acquired faster than a full resolution frame $F_{full}$. However, the down-sampled frame $F_{down}$ has reduced resolution compared to a full resolution scan $F_{full}$, and the low spatial frequency property of touch event signals is lost, which can cause detection errors such as registering an incorrect position of a touch event or not registering a touch event.

Compressive sensing methods may be applied to the down-sampled, or partial, frame $F_{down}$ to generate a new, reconstructed frame $F_{recon}$ in which the original resolution is recovered, i.e. the reconstructed frame $F_{recon}$ takes the form of an array which includes a value corresponding to each sensor area in the touchscreen panel 1. For example, the compressive sensing method may be a minimum $\ell_1$ norm algorithm. As further explained hereinafter, compressive reconstruction may be employed due to the sparse nature of touch event signals. The reconstructed frame $F_{recon}$ is used to estimate locations of touch events. The reconstructed frame $F_{recon}$ may also be used to estimate the approximate shape and extent of a region corresponding to a touch event.

Estimated locations of touch events determined using the reconstructed frame $F_{recon}$ may be different to the original locations of touch events. Equivalent detection accuracy to a full resolution frame $F_{full}$ may be realised by acquiring regional sub-frames $F_{reg}$. Obtaining regional sub-frames $F_{reg}$ involves acquiring one or more regional sub-frames $F_{reg}$ based on the touch event location(s) estimated using the reconstructed frame $F_{recon}$. Each regional sub-frame $F_{reg}$ is acquired by sampling all the sensor areas $I_{n,m}$ within a region, or sub-array, 3 of the array 2 of the touchscreen panel 1, i.e. each regional sub-frame has the same resolution as a full resolution frame Fra within the respective sampled region 3. In general, a region 3 is a square or rectangular block of sensor areas $I_{n,m}$. For example, if the array 2 of a touchscreen includes N rows and M columns such that the sensor area $I_{n,m}$ corresponds to the $n^{th}$ of N rows and the $m^{th}$ of M columns, then a region 3 may be defined as, for example, n±2, m±2. Such a region or 3 would include a total of 25 sensor areas $I_{n,m}$. Regions 3 need not be square or rectangular and may be defined as any grouping of contiguous sensor areas $I_{n,m}$. The regions 3 include and encompass the estimated locations of touch events determined using the reconstructed touch signal frame $F_{recon}$. Each region 3 may be centred on the sensor array $I_{n,m}$ closest to the corresponding estimated location.

Where a frame is a multi-touch frame, one regional sub-frame $F_{reg}$ may be obtained for each detected touch event. Alternatively, a single regional sub-frame $F_{reg}$ may be obtained for a multi-touch event by sampling sensor areas $I_{n,m}$ within multiple regions 3, each region 3 including a corresponding location of a touch event estimated from the reconstructed frame $F_{recon}$. Regional sub-frames $F_{reg}$ may take the form of arrays having the original resolution and assign a value of zero to pixels corresponding to un-sampled sensor areas $I_{n,m}$. Alternatively, regional sub-frames frames $F_{reg}$ may take the form of a listing of coordinates of sampled sensor areas $I_{n,m}$ and the corresponding sampled values. Alternatively, the regional sub-frames $F_{reg}$ may take the form of an array having reduced resolution. For example, if a region is 5 by 5 sensor areas then a corresponding regional sub-frame may have a resolution of 5 by 5 pixels.

The size of each region (or sub-array) 3, sampled when acquiring a regional sub-frame $F_{reg}$ may be fixed or may be determined based on the quality of the new, reconstructed frame $F_{recon}$. Alternatively, the sizes of regions 3 sampled when acquiring a regional sub-frame $F_{reg}$ may be determined based on estimates of the shape and extent of a touch event determined using the reconstructed touch frame $F_{recon}$.

In this way, the detection accuracy of locations of touch events may be maintained whilst the energy consumption is decreased. This is possible because the total number of sampling operations to acquire the down-sampled, or partial, frame $F_{down}$ and the regional sub-frame $F_{reg}$ may be less than the total number of sensor areas $I_{n,m}$. This may be especially significant when a touchscreen panel 1 includes a large number of sensor areas $I_{n,m}$. When a touchscreen panel 1 samples sensor areas $I_{n,m}$ sequentially, the acquisition interval may also be reduced and responsivity correspondingly improved. When a touchscreen panel 1 samples sensor areas $I_{n,m}$ substantially simultaneously, the compressive sensing algorithm and the obtaining of regional sub-frames $F_{reg}$ may be fast enough to maintain the responsivity above a threshold of user perceptibility.

Optionally, additional sub-frames $F_{add}$ may be acquired by sampling sensor areas $I_{n,m}$ within regions (or sub-arrays) 3. For example, additional sub-frames $F_{reg}$ may be used for averaging to reduce the effect of noise spikes. Preferably, the additional time for acquiring additional sub-frames $F_{add}$ should not bring the responsivity below a threshold of user perceptibility. For larger arrays of sensor areas $I_{n,m}$, several additional sub-frames $F_{add}$ may be acquired for the same or lower energy cost than a single full resolution frame $F_{full}$. Similarly, for a touchscreen panel 1 in which sensor areas $I_{n,m}$ are sampled sequentially, several additional sub-frames $F_{add}$ may be acquired in the same or shorter time interval than a single full resolution frame $F_{full}$.

Compressive sensing and reconstruction: Before describing a first method of processing output signals from a touchscreen panel, which uses compressive sensing, and without wishing to be bound by theory, it may be useful to briefly review techniques of compressive sensing and reconstruction for sparse signals.

Compressive sensing is a signal processing technique for the reconstruction of a sparse signal by finding solutions to underdetermined linear systems using a small fraction of the information of the original signal.

Four steps involved in an example of a conventional sampling process are sampling, compressing, storing/transmitting, and uncompressing. According to the Shannon/Nyquist sampling theorem, the sampling frequency (spatial or temporal as appropriate) should not be less than two times of the highest frequency of the original signal, if the signal needs to be recovered perfectly. However, this requirement can set high requirements for hardware, in particular when the frequency (spatial or temporal) of the original signal is high. Additionally, such an example of a conventional sampling process can result in wasted resources, since data compression is a necessary procedure in a host of applications. Consequently, the Shannon/Nyquist method may not be the optimal sampling theorem for many applications.

In contrast, compressive sensing theory includes three parts: signal's sparse expression, establishment of measurement matrix, and signal's reconstruction. The process of the signal's sparse expression is to concentrate the energy in all samples of the original signal into a few samples in the new signal, i.e. a sparse signal. A sparse represented signal only contains a few large coefficients and many small or zero coefficients. Most natural signals are non-sparse signals. However, according to the Harmonic theory, a one dimensional signal $f$ with length K can be represented as a linear combination of a set of orthonormal basis, for example using an K×K matrix. Some widely used orthonormal bases include the discrete cosine transform (DCT) basis, the fast Fourier transform (FFT) basis, and the discrete wavelet transform (DWT) basis. The function $f$ may be expressed in an orthonormal basis as:

$$f = \sum_{i=1}^{K} x_i \psi_i \text{ or } f = \psi x$$

in which $x_i$ are the coefficients of the sparse signal x, involving a few large coefficients, and $\psi_i$ are the basis functions. For example, there may be a total of $K_L$ large coefficients, where $K_L \ll K$.

According to the character of the orthonormal basis, $\psi$ is reversible. Consequently, x and $f$ correspond to the same signal represented in different domains. By means of obtaining information about the $K_L$ large coefficients in the signal x, it is possible to reconstruct the original signal $f$ to a certain degree of accuracy. Nevertheless, the $K_L$ non-zero large coefficients cannot be employed to reconstruct the original signal directly, due to the uncertainty of the locations of the $K_L$ non-zero large coefficients, i.e. which coefficients xi belong to the set of $K_L$ non-zero large coefficients.

The objective of establishing a measurement matrix is to measure the sparse signal x, and store the location information of the $K_L$ large coefficients. Here we consider a normal situation of reconstructing a signal x. That is, we have a known measurement matrix $\phi \in R^{L \times K}$ (L<<K), an unknown signal x and a linear measurement value $y \in R^L$ under the matrix $\phi$.

$$y = \phi x$$

Because L<<K, the dimension of the signal y is much less than that of the signal x, Equation 2 offers infinite solutions for the unknown signal x, and the reconstruction can hardly be achieved. However, it has been proved that if the matrix $\phi$ (measurement matrix) satisfies the requirement of restricted isometry property (RIP), the unknown signal x can be solved by calculating the $\ell_0$ norm optimization problem.

$$\hat{x} = \mathrm{argmin} \|x\|_0 \, s.t. \, \phi x = y$$

in which $\|\odot\|$ denotes the number of non-zero elements in the vector x.

Now the medium has been acquired to employ the concept of compressed sensing to compressing a natural signal $f$:

$$f = \psi x \Rightarrow x = \psi^{-1} y; y = \phi x \Rightarrow y = \phi \psi^{-1} f$$

$$\phi \psi^{-1} = \Omega \Rightarrow y = \Omega f$$

in which $\Omega$ is an L×K matrix termed the sensing matrix.

However, it can be difficult to construct a matrix satisfying the requirement of restricted isometry property in practice. An equivalent condition has been proposed, namely that the measurement matrix $\phi$ is not related to the orthonormal basis $\psi$. It has been proved that when $\phi$ is a Gaussian random matrix, the sensing matrix $\Omega$ can meet the restricted isometry property requirement at a large probability. The merit of using the Gaussian measurement matrix is that it is almost unrelated to any parse signal, so it requires the least number of measurement times. However, due to the non-structure characteristic of the Gaussian matrix, large storage space is needed for all the matrix elements, which may introduce complex calculations. Other measurement matrixes which may meet the restricted isometry property requirement include the unit ball matrix, the binary stochastic matrix, and the partial Fourier matrix.

The process of recovering a sparse signal x (K×1) by sampling a vector y L times (L<<K), is the core of compressed sensing theory. In has been proven that by means of calculating the minimum $\ell_0$ norm problem, the issue of signal's construction can be resolved. However, it has also been pointed out that the minimum $\ell_0$ norm problem is a NP-hard problem, which is impossible to resolve because of the need to exhaustively know all the permutations of non-zero values in x. Thus, many algorithms have been proposed to calculate the optimum solution, such as, for example, the minimum $\ell_1$ norm method, a series of matching pursuit (MP) algorithms, and the iterative threshold method. As an example, the matching pursuit algorithm shall be explained.

Matching pursuit (MP) algorithms are a type of greedy algorithms. An example of a matching pursuit algorithm is to find the signal's "best matching" projections (in order to construct sparse approximation) onto the over complete dictionary (measurement matrix $\phi$) in each iteration, calculate the signal's residual error, and select the atom best matching the signal residual error. After a certain number of iterations, the signal can be linearly expressed by some atoms. Due to the non-orthogonal character of a signal's projection on a given atom set (column vectors of measurement matrix), the result of each iteration may not be optimized. This results in a relatively large number of iterations in order to achieve constringency. Considering this, an orthogonal matching pursuit (OMP) algorithm is proposed. In an OMP algorithm, a selected atom set is orthogonalized to ensure optimization in each iteration. It has been proved that for a given $K_L$ sparse K dimension discrete signal x measured by an L×K Gaussian measurement matrix, to reconstruct the original signal, the number of measurements L (dimension of y) should satisfy:

$$M=O(k \ln (K))$$

Touchscreen system: Referring to FIG. 2, a touchscreen system 4 includes a touchscreen panel 1 and a touch controller 5. The touchscreen panel includes a two dimensional N by M array or grid 2 of sensor areas $I_{n,m}$. $I_{n,m}$ denotes the $n^{th}$ of N sensor areas spaced apart in a first direction $d_1$ and the $m^{th}$ of M sensor areas spaced apart in a second direction $d_2$. The first and second directions $d_1$, $d_2$ may be, for example, perpendicular x and y directions of Cartesian axes. Sensor areas $I_{n,m}$ have a characteristic dimension l and are spaced apart in the first and second directions $d_1$, $d_2$ by an amount s. The sensor areas $I_{n,m}$ have an active area $A_s$, and may or may not have the same shape in the first and second directions $d_1$, $d_2$. The sensor areas $I_{n,m}$ may or may not be spaced apart by the same amount s in the first and second directions $d_1$, $d_2$. Each sensor area $I_{n,m}$ is typically defined by the overlap or intersection of a first electrode $X_n$ extending in the first direction $d_1$ and an second electrode $Y_m$ extending in the second direction $d_2$, the first electrodes $X_1$, ..., $X_n$, ... $X_N$ and second electrodes $Y_1$, ..., $Y_m$, ..., $Y_M$ defining the array 2 of sensor areas $I_{n,m}$ by their intersections. Alternatively, each sensor area $I_{n,m}$ may be a discrete sensor. The sensor areas $I_{n,m}$ may produce signals indicating one or more of a capacitance, a resistance and a pressure, depending on the type of touchscreen panel 1.

The touch controller 5 includes a frame acquisition module 6, a signal reconstruction module 7, a touch decision module 8, a sub-frame acquisition module 9 and a communications module 10. The touch controller 5 may optionally include a shape recognition module 11. The touch controller 5 may optionally include a correlated double sampler 12 and a reference frame store 13. The touch controller 5 may optionally include a spatial low pass filter (SLPF) mask store 14. Where the touch controller 5 includes a spatial low pass filter mask store 14, the touch controller may optionally further include a bandwidth decision module 15.

The frame acquisition module 6, the signal reconstruction module 7 the touch decision module 8, the sub-frame acquisition module 9, the communications module 10 and optionally the shape recognition module 11, correlated double sampler 12 and the bandwidth decision module 15 may be provided by one or more hardware modules, or they may be provided as modules executed by one or more data processors. The one or more hardware module(s) may be, for example, microcontrollers or dedicated integrated circuits. The optional reference frame store 13 and spatial low pass filter mask store 14 may be provided by, for example, volatile or non-volatile memory (not shown) or a storage device (not shown). For example, the volatile or non-volatile memory may be provided by one or more microcontrollers or dedicated integrated circuits, or they may be associated with one or more data processors. When the optional reference frame store 13 and spatial low pass filter mask store 14 are provided by a volatile memory (not shown), they may be stored in a non-volatile memory (not shown) or storage device (not shown) when the touchscreen system 4 is not powered.

The frame acquisition module 6 samples output signals from the sensor areas $I_{n,m}$. The frame acquisition module 6 is capable of sampling all of the sensor areas $I_{n,m}$ to acquire a full resolution frame $F_{full}$ or sampling a sub-set or fraction of the total number of sensor areas $I_{n,m}$ belonging to the array 2 of the touchscreen panel 1. For example, the frame acquisition module 6 may acquire a down-sampled, or partial, frame $F_{down}$, a regional sub-frame $F_{reg}$ or an additional sub-frame $F_{add}$. The frame acquisition module 6 may collate the sampled signals as a signal frame matrix or array. The output signal from the sensor area $I_{n,m}$ is denoted F(n,m) in which the integer indices n, m denote the row and column of an entry in the frame array which stores the output signal from the sensor area $I_{n,m}$. Alternatively, the frame acquisition module 6 may collate the sampled signals as a list matching locations with the corresponding signals values, e.g. an entry in a list may take the form n, m, F(n,m). Such a listing should also be understood as a frame. A listing may be readily converted to an array by generating a zero-initialised array of appropriate size and setting the pixels of the listed locations n,m to the corresponding listed values F(n,m).

The frame acquisition module 6 may acquire full resolution frame values $F_{full}(n,m)$ at an acquisition frequency $f_s$, having a corresponding acquisition interval $\Delta T_{acq}$. The signal values of a first down-sampled, or partial, frame acquired are denoted $F_{down}(n,m,1)$ and the signal values of the $k^{th}$ down-sampled frame $F_{down}$ acquired are denoted $F_{down}(n,m,k)$. When the optional reference frame store 13 is included in the touch controller 5, the first frame acquired $F_{down}(n,m,1)$, for example upon powering up the touchscreen system 4, may be stored to the reference frame store 13 as a reference frame values $F_0(n,m)$. The reference frame $F_0$ may take the form of an array or matrix, or the reference frame $F_0$ may take the form of a listing as appropriate. In the form of an array or matrix, a frame, e.g. $F_{down}(n,m,k)$ can be treated in a similar way to an image, which allows touchscreen signals corresponding to a touch event to be easily visualised and also processed using image processing methods. The index k is used to denote the order of sequence of down-sampled, or partial, frames $F_{down}$. When they relate to the $k^{th}$ down-sampled, or partial, frame $F_{down}(n,m,k)$, the values of other sampled frames such as, for example, regional or additional sub-frames $F_{reg}$, $F_{add}$ shall be denoted $F_{reg}(n,mk)$, $F_{add}(n,m,k)$ even though such frames are sampled at subsequent times to the corresponding down-sampled frame values $F_{down}(n,m,k)$.

The frame acquisition module 6 may sample the sensor areas $I_{n,m}$ sequentially, for example by scanning or rastering. Alternatively the frame acquisition module 6 may sample each sensor area $I_{n,m}$ substantially simultaneously, for example, when sensor areas $I_{n,m}$ are discrete sensors rather than intersections of first and second electrodes $X_n$, $Y_m$. The acquisition frequency $f_s$ is typically between about 20 Hz and about 200 Hz. Faster and slower acquisition frequencies $f_s$ are in principle possible, however, slower acquisition frequencies $f_s$ may result in slow response times or failures to properly register short or dynamic touch events. Faster acquisition frequencies $f_s$, for example significantly above a threshold for user perceptibility, may be redundant given typical speeds of user interaction. The frame acquisition module 6 may be active or passive. When the frame acquisition module 6 is active, excitation signals may be addressed to the sensor area being sample in addition to receiving an output signal from the sensor area $I_{n,m}$. For example, in a projected capacitance touchscreen panel, the frame acquisition module 6 sends excitation signals to a drive electrode $D_n$, for example a first electrode $X_n$, and receives output signals from a sense electrode $S_m$, for example a second electrode $Y_n$. When the frame acquisition module 6 is passive, the frame acquisition module 6 only receives, and optionally amplifies, output signals from the sensor areas $I_{n,m}$. For example, the frame acquisition module 6 may receive and amplify charge from piezoelectric sensors in a pressure sensing touchscreen panel. The frame acquisition module 1 may combine active and passive reading of several quantities concurrently, for example, combined sensing of capacitance and pressure values.

The signal reconstruction module 7 receives a down-sampled frame $F_{down}$ and applies a reconstruction method to the down-sampled frame to generate a new, reconstructed frame $F_{recon}$. In a first method of processing output signals the signal reconstruction module 7 applies a compressive sensing method to generate a new, reconstructed frame $F_{recon}$. In a second method of processing output signals the signal reconstruction module 7 applies a spatial low-pass filtering method to generate a new, filtered frame $F_{LPSF}$.

The touch decision module 8 determines the presence or absence of one or more touch events based on the reconstructed frame $F_{recon}$ of the filtered frame $F_{LPSF}$. When at least one touch event is registered, the touch decision module 8 determines an estimated touch location corresponding to each touch event. The touch decision module 8 may additionally determine estimates of the size and shape of touch events.

The sub-frame acquisition module 1 receives estimated locations of one or more touch events and instructs the frame acquisition module 6 to acquire one or more regional sub-frames $F_{reg}$ by sampling the sensor areas $I_{n,m}$ within one or more corresponding regions (or sub-arrays) 3 of the array 2. The region 3 corresponding to each touch event registered by the touch decision module 8 includes the sensor area $I_{n,m}$ closest to the estimated location of the touch event. The regions 3 may be centred on the corresponding estimated touch locations. The sub-frame acquisition module 9 may instruct the frame acquisition module 6 to acquire a single regional sub-frame $F_{reg}$ by sampling the sensor areas $I_{n,m}$ within one or more regions 3. Alternatively, the sub-frame acquisition module 9 may instruct the frame acquisition module 6 to acquire a separate regional sub-frame $F_{reg}$ corresponding to each touch event. Each region 3 sampled may be of equal size. Alternatively, the sampled regions 3 may have different sizes, for example, in a case where the touch decision module 8 estimates the size and shape of the signal corresponding to a touch event. The sub-frame acquisition module 9 may additionally instruct the frame acquisition module 6 to acquire one or more additional sub-frames $F_{add}$. Additional sub-frames $F_{add}$ may be used to provide data for interpolation of a touch event location, to confirm a touch event location or to reduce noise by averaging a regional sub-frame $F_{reg}$ with one or more additional sub-frames $F_{add}$ repetitively sampled from the same region 3.

The communications module 10 receives touch information 16 from the sub-frame acquisition module 9 and sends the touch information 16 to a device central processing unit (CPU) 17 of a device incorporating the touchscreen panel. The touch information 16 may be processed information such as, for example, the locations of detected touch events determined based on the regional sub-frame(s) $F_{reg}$ and/or the additional sub-frame(s) $F_{add}$. Alternatively, the touch information 16 may consist of one or more regional sub-frames $F_{reg}$ and/or one or more additional sub-frames $F_{add}$ and the device CPU 17 may process the regional sub-frames $F_{reg}$ and/or additional sub-frames $F_{add}$ to determine the touch event locations. The touch information 16 may also include intermediate frames such as the down-sampled frame $F_{down}$, the reconstructed frame $F_{recon}$ or the filtered frame $F_{LPSF}$.

The optional correlated double sampler 12 applies correlated double sampling to the down-sampled, or partial, frame $F_{down}$ acquired by the frame acquisition module 6 by subtracting a reference frame $F_0$ stored in the optional reference frame store 13. The reference frame values $F_0$ may take the form an array or matrix of values $F_0(n,m)$. Alternatively, the reference frame $F_0$ may be stored as a listing of coordinates and corresponding values, for example one entry in the list might take the form of coordinates n, m and corresponding value $F_0(n,m)$.

When the signal reconstruction module 7 applies a linear spatial low-pass filter, the optional spatial low-pass filter store 14 stores the coefficients of the linear spatial low-pass filter and supplies them to the signal reconstruction module 7. The signal reconstruction module 7 may apply a spatial low-pass filter when a second method of processing output signals is used.

The signal reconstruction module may also apply a spatial low-pass filter to the reconstructed frame $F_{recon}$ in a modification of the first method. The optional bandwidth decision module 15 may update the coefficients of the stored linear spatial low-pass filter to increase or decrease the filter bandwidth in response to information received from the touch decision module 8.

The optional shape recognition module 11 may receive the new, reconstructed frame $F_{recon}$ or the new, filtered frame FLPSF and determine shape information of one or more touch events. For example, shape information may be used to determine whether a touch event corresponds to a tap or a swipe. Shape information may also be used to distinguish between a touch by a user's digit or a touch by a user's palm. The shape information may be provided to the communications module 10 and included in the touch information 16.

Further details of the elements of the touch controller 5 will be described in relation to first and second methods of processing output signals from a touchscreen panel 1, and modifications thereof.

The hereinafter described first and second methods of processing output signals from a touchscreen panel 1 may be used with any type of touchscreen panel 1 which outputs signals corresponding to sensor areas $I_{n,m}$ arranged in a two dimensional array or grid 2. To aid the understanding of the first and second methods of processing output signals, it may be helpful to briefly discuss possible examples of a suitable type of touchscreen panel 1, namely a projected capacitance touchscreen.

Capacitive touchscreen panels: Two architectures which are used for capacitance touchscreens are surface capacitance based and projected capacitance based. Projected capacitance offers good resolution and may experience lower noise. First and second methods of processing output signals from touch panels may be applied to projected capacitance touchscreen panels, amongst other types of touchscreen panels Projected capacitance touchscreen panels measure changes of capacitance at electrodes to detect a touch event. The term projected capacitance refers to the fact that electrodes of a projected capacitance touchscreen panel need not be physically touched by a conducting object to detect a touch event. In general, electrodes of a projected capacitance touchscreen panel may be located behind a screen, for example made of glass or transparent polymer. When a conducting object such as, for example, a user's digit 33 (FIG. 5) or a conductive stylus touches the screen, the electric field lines will be perturbed, thus modulating the charge distribution and hence the capacitance.

Projected capacitance touchscreen panels may operate according to self-capacitance of individual electrodes or mutual capacitance between pairs of electrodes. Mutual capacitance operation supports multi-touch events, and may be less sensitive to electromagnetic interference (EMI).

Figure 3:
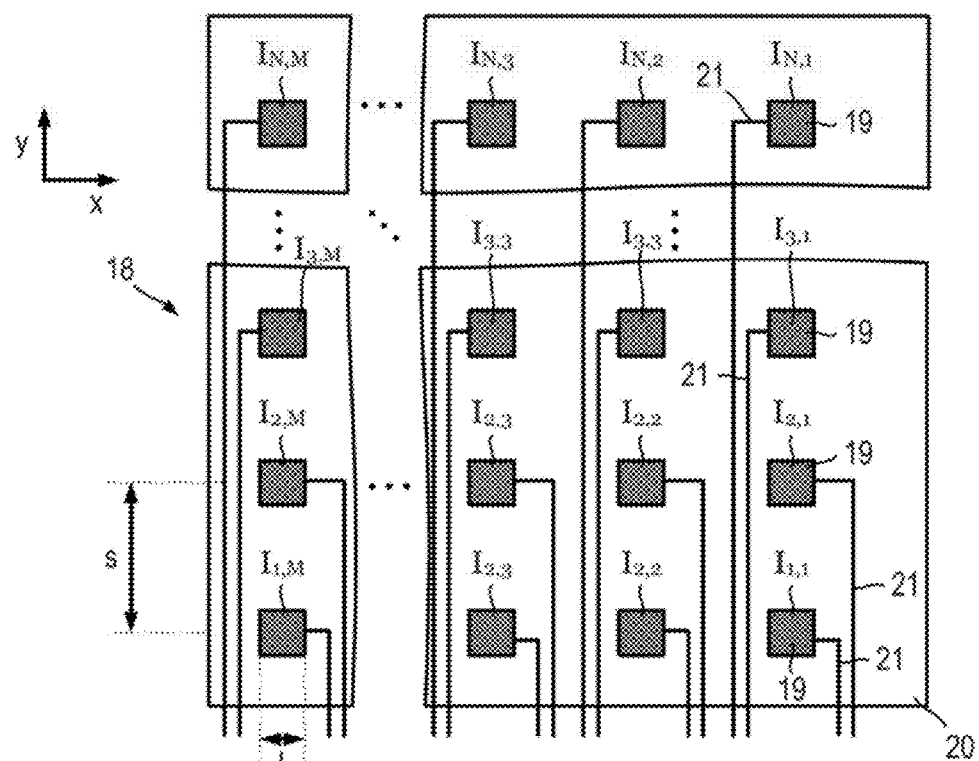
FIG. 3 shows an electrode arrangement for a first projected capacitance touchscreen panel for self-capacitance measurements.

Referring to FIG. 3, a first projected capacitance touchscreen panel 18 is suitable for self-capacitance operation and includes an array of conductive pads 19 disposed on a layer of dielectric material 20. Each conductive pad 19 is formed of conductive material and defines a sensor area $I_{n,m}$ which is individually addressable via a corresponding conductive trace 21. The layer of dielectric material 20 extends in a plane defined by first and second perpendicular directions $d_1$, $d_2$ in the form of Cartesian axes x, y, and has a thickness in a third direction perpendicular to the first and second directions x, y which is substantially less than any in-plane dimension of the dielectric layer 20. The conductive pads 19 are disposed on a first surface of the dielectric layer 20, for example, an upper surface. Conductive pads 19 may take the form of square with a side length of dimension l and be spaced apart in the first and second directions x, y by an amount s. Each conductive pad 19 defines an active area $A_s$. The conductive pads 19 need not be square, and may be rectangular. The conductive pads 19 may be other regular or irregular polygonal shapes such as, for example, triangles, pentagons, or hexagons. The conductive pads 19 need not be spaced apart by the same amount in the first and second directions x, y to form a square grid. In general, the conductive pads 19 may be disposed as the points of any two-dimensional lattice.

The dielectric material layer 20 is commonly transparent when the first projected capacitance touchscreen panel 18 overlies or is incorporated into a display, for example a organic light emitted diode (OLED) or liquid crystal (LC) display. For example, the dielectric material layer 20 may be glass, or may be a transparent polymer such as, for example, polyethylene terephthalate (PET) or similar plastics. The conductive pads 19 may also be transparent when the first projected capacitance touchscreen panel 18 overlies or is incorporated into a display. For example, the conductive pads 19 may be formed form indium tin-oxide (ITO) or indium zinc-oxide (IZO).

Figure 4A:
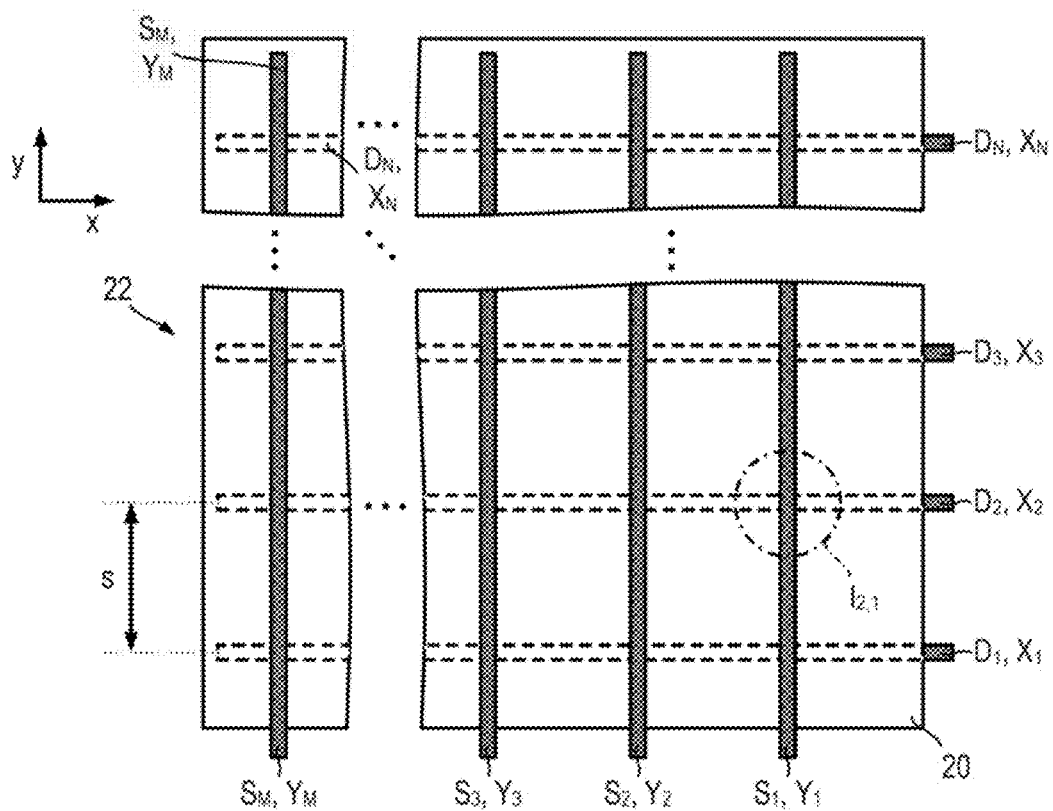
FIGS. 4A to 4C show electrode arrangements for second to fourth projected capacitance touchscreen panels for mutual or self-capacitance measurements.

Referring to FIG. 4A, a second projected capacitance touchscreen panel 22 is suitable for self or mutual capacitance operation and includes first electrodes $X_n$, in the form of a number of drive electrodes $D_1, D_2, \ldots, D_N$ and second electrodes $Y_m$ in the form of a number of sense electrode $S_1$, $S_2, \ldots, S_M$ disposed on a layer of dielectric material 20. The layer of dielectric material 20 extends in a plane defined by first and second perpendicular directions x, y, and has a thickness in a third direction perpendicular to the first and second directions x, y which is substantially less than any in-plane dimension of the dielectric layer 20. The sense electrodes $S_m$ are disposed on a first surface of the dielectric layer 20, for example, an upper surface, and the drive electrodes $D_n$ are disposed on a second surface of the dielectric layer 20 which is opposite to the first surface in the third direction. Each intersection of a drive electrode $D_n$ and a sense electrode $S_n$ defines a sensor area $I_{n,m}$. The drive electrodes $D_n$ take the form of rectangular strips of conductive material, elongated in the first direction x and oriented parallel to each other. The drive electrodes $D_n$ are spaced apart by an amount s in the second direction y perpendicular to the first direction x. The sense electrodes $S_m$ take the form of rectangular strips of conductive material, elongated in the second direction y and oriented parallel to each other. The sense electrodes $S_m$ are spaced apart by an amount s in the first direction x perpendicular to the second direction y.

The dielectric material layer 20 is commonly transparent when the second projected capacitance touchscreen panel 22 overlies or is incorporated into a display, for example a organic light emitted diode (OLED) or liquid crystal (LC) display. For example, the dielectric material layer 20 may be glass, or may be a transparent polymer such as, for example, polyethylene terephthalate (PET) or similar plastics. The drive and sense electrodes, $D_n$, $S_m$ may also be transparent when the second projected capacitance touchscreen panel 22 overlies or is incorporated into a display. For example, drive and second electrodes $D_n$, $S_m$ may be formed from indium tin-oxide (ITO) or indium zinc-oxide (IZO).

Figure 4B:
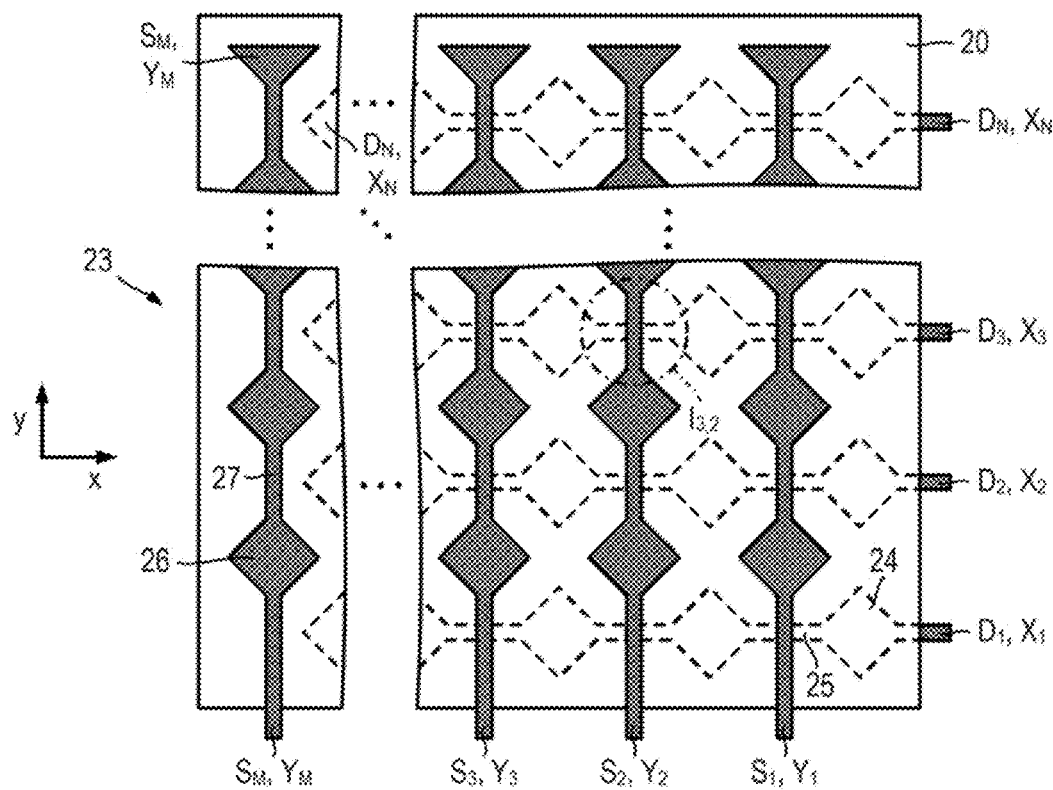

Referring also to FIG. 4B, a third projected capacitance touchscreen panel 23 is the same as the second projected capacitance touchscreen panel 22, except that the drive and sense electrodes $D_n$, $S_m$ are different shapes. In the third projected capacitance touchscreen panel 23, the drive electrodes $D_n$ take the form of a number of diamond shaped regions of conductive material 24 spaced apart in the first direction x and connected by narrow strips of conductive material 25. The sense electrodes $S_m$ may take the form of a number of diamond shaped regions of conductive material 26 spaced apart in the second direction y and connected by narrow strips of conductive material 27.

Figure 4C:
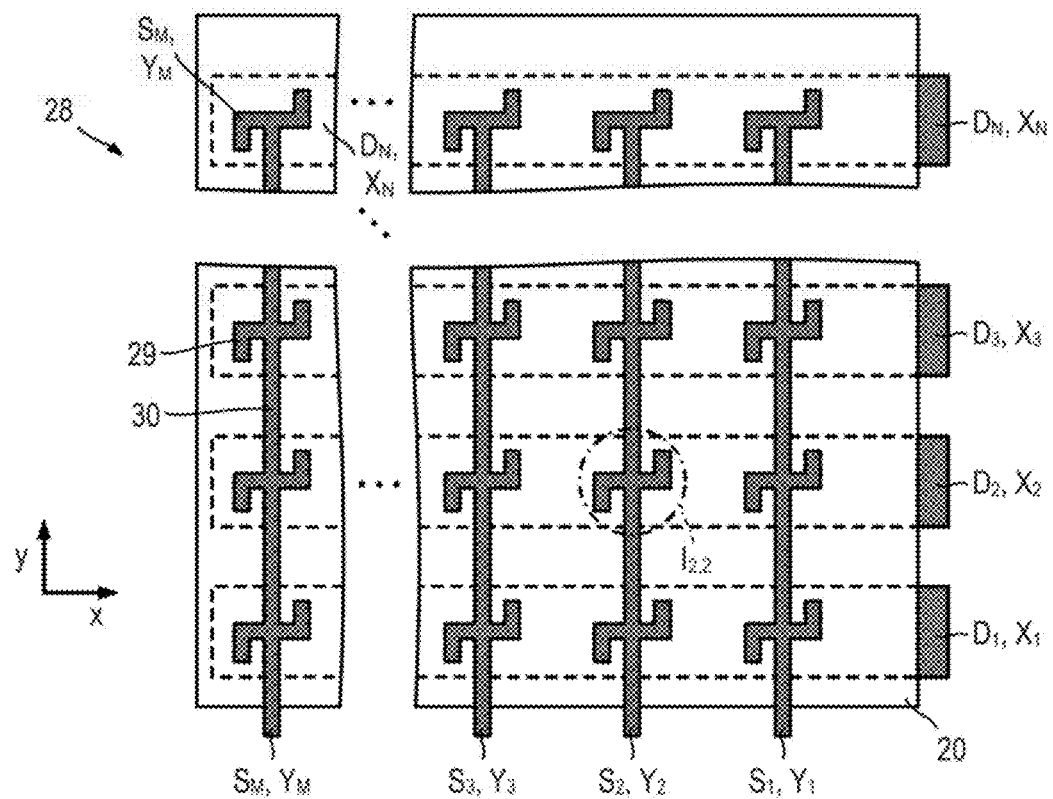

Referring also to FIG. 4C, a fourth projected capacitance touchscreen panel 28 is the same as the second and third projected capacitance touchscreen panels 22, 23, except that the drive and sense electrodes $D_n$, $S_m$, are different shapes. In the fourth projected capacitance touchscreen panel 28, the drive electrodes $D_n$ may take the form of rectangular strips which are elongated in the first direction x and which are relatively wide in the second direction y. The sense electrodes $S_m$ may take the form of a number of relatively narrow "Z-shaped" regions of conductive material 29 spaced apart in the second direction y and connected by narrow strips of conductive material 30. The drive and sense electrodes $D_n$, $S_m$ of the fourth projected capacitance touchscreen panel 28 are arranged so that each Z-shaped conductive region 29 of a sense electrode $S_m$ is located overlying a corresponding drive electrode $D_n$. The drive and sense electrodes $D_n$, $S_m$ of the fourth projected capacitance touchscreen panel 28 are dimensioned, in particular the width of each drive electrode $D_n$, so that no part of a Z-shaped conductive region 29 does not overlie a respective drive electrode $D_n$. This is sometimes referred to as a "flooded" configuration. The sense electrodes $S_m$ need not use Z-shaped conductive regions 29, and other narrow shapes overlying a drive electrode $D_n$ may be used such as, for example, "H-shaped" or "I-shaped" conductive material regions.

Electrodes labelled as drive electrodes $D_n$ in the second, third or fourth projected capacitance touchscreen panels 22, 23, 28 may alternatively be operated as sense electrodes $S_n$ and electrodes labelled as sense electrodes $S_m$ may alternatively be operated as drive electrode $D_m$. In some examples, an electrode need not have a fixed role and may alternate between being a drive electrode and a sense electrode. The second, third or fourth projected capacitance touchscreen panels 22, 23, 28 may alternatively be operated using by sampling the self-capacitance of each drive electrode $D_n$ and each sense electrode $S_n$ separately.

A projected capacitance touchscreen panel for mutual or self-capacitance operation need not use electrode arrangements described in relation to the second, third or fourth projected capacitance touchscreen panels 22, 23, 28. Alternatively, any two-dimensional array or grid 2 of electrodes suitable for sampling mutual capacitance between pairs of electrodes may be used.

Figure 5:
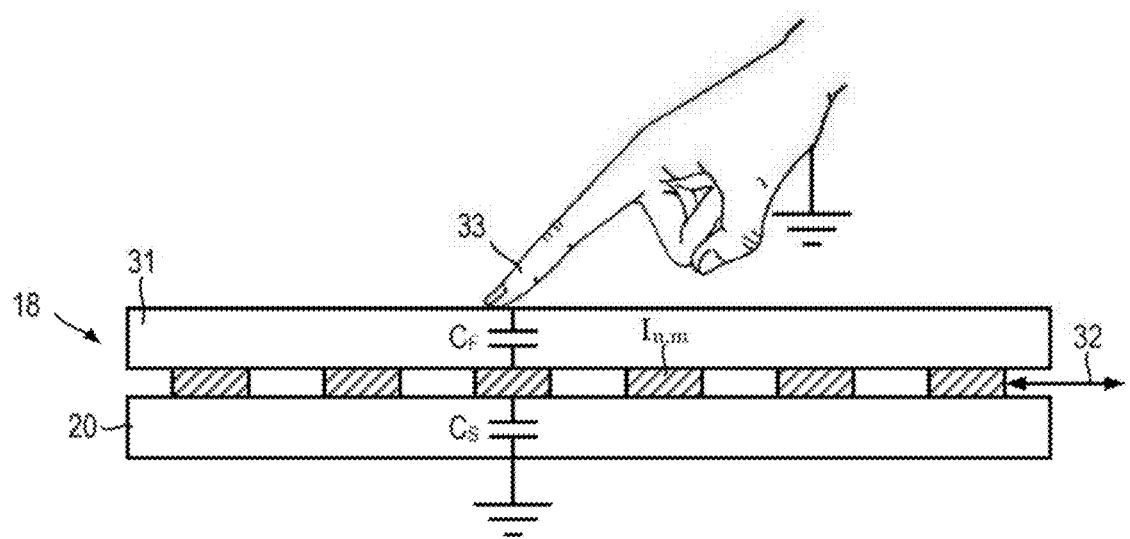
FIG. 5 illustrates self-capacitance measurements using a projected capacitance touchscreen.
Figure 6:
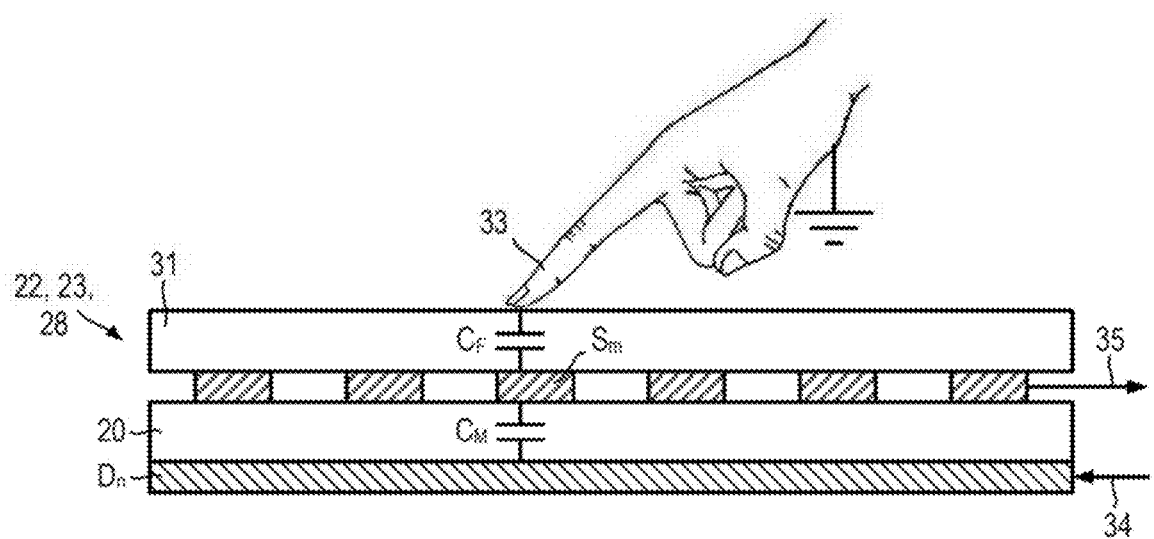
FIG. 6 illustrates mutual-capacitance measurements using a projected capacitance touchscreen.

Referring to FIGS. 5 and 6, the electrodes of a projected capacitance touchscreen panel 18, 22, 23, 28 may be covered over with a cover lens 31. The cover lens 31 is generally transparent and may be formed of transparent materials such as, for example, of glass or PET.

Referring to FIGS. 3 and 5, in a self-capacitance touchscreen panel, for example the first projected capacitance touch panel 18, the conductive pads 19 each define a sensor area $I_{n,m}$. Each sensor area $I_{n,m}$ may be individually addressed by the frame acquisition module 6 by using the respective conductive trace 21 to drive and measure the sensor area $I_{n,m}$. For example, a sensor area in the form of a conductive pad 19 may be driven by a self-capacitance measurement signal 32 and the frame acquisition module 6 may measure the self-capacitance of the sensor area $I_{n,m}$ based on the charge measured by an internal charge amplifier (not shown). When there is no touch event, the frame acquisition module 6 will measure the baseline self-capacitance $C_S$ between the conductive pad 19 and ground. During a touch event, an additional capacitance $C_F$ couples the conductive pad 19 and the user's digit 33 or a suitable conductive stylus (not shown). The additional capacitance $C_F$ is in parallel with the baseline self-capacitance $C_S$, resulting in an increment in the total capacitance measured. The magnitude of the additional capacitance $C_F$ during a touch event is not fixed, and may vary depending upon factors such as, for example, the contact area of the user's digit 33 or the suitable conductive stylus.

The sensor areas $I_{n,m}$ in the form or conductive pads 19 may be sampled sequentially or substantially simultaneously in order to acquire a signal frame from the first projected capacitance touchscreen panel 18. In this way, both single-touch events and multi-touch events may be registered.

Referring also to FIGS. 4A to 4C, self-capacitance measurements may also be performed using capacitive touchscreen panels which employ a grid of rows and columns to form an array 2 of sensor areas $I_{n,m}$, for example, using the second, third or fourth projected capacitance touchscreen panels 22, 23, 28. In this case, the first electrodes $X_n$ in the form of drive electrodes $D_n$ correspond to a one-dimensional array of sensor areas $I_n$ and the second electrodes $Y_n$ in the form of sense electrodes $S_m$ correspond to a one-dimensional array of sensor areas $I_m$. The self-capacitance between each drive electrode $D_n$ and ground is measured by the frame acquisition module 6 and likewise for each sense electrode $S_m$. Columns and rows may represent x and y coordinates respectively. For example, drive electrodes $D_n$ may correspond to a y coordinate and sense electrodes $S_m$ may correspond to an x coordinate or vice versa. Thus, although each intersection of drive and sense electrodes $D_n$, $S_m$ indicates a unique location on the touchscreen, it cannot support multi-touch as ghost touch points are created.

Referring to FIGS. 4A to 4C and FIG. 6, the second, third and fourth projected capacitance touchscreen panels 22, 23, 28 may also be used to measure mutual capacitances between a pair of a first electrode $X_n$ in the form of a drive electrode $D_n$ and a second electrode $Y_m$ in the form of a sense electrode $S_m$. Each intersection of drive and sense electrodes $D_n$, $S_m$ defines a sensor area $I_{n,m}$, and each intersection $I_{n,m}$ may be sampled individually by the frame acquisition module 6 of the touch controller 5 addressing the appropriate combination of drive and sense electrodes $D_n$, $S_m$. Multi-touch events may be detected in mutual capacitance operation because each sensor area $I_{n,m}$, i.e. each intersection, may be read individually. Mutual capacitance operation may be less sensitive to electromagnetic interference (EMI) compared to self-capacitance operation. However, in contrast to self-capacitance operation using separate conductive pads 19, for example using the first projected capacitance touchscreen panel 18, the sensor areas $I_{n,m}$ may not be sampled simultaneously for mutual capacitance. The acquisition frequency $f_s$ for mutual capacitance operation may be typically around 60 Hz, but may be more than 100 Hz or up to 6,400 Hz.

For mutual capacitance operation, the drive electrode $D_n$ corresponding to an addressed sensor area or intersection $I_{n,m}$ is driven by a driving signal 34, and an output signal 35 is read out from the respective sense electrode $S_m$ of the addressed intersection $I_{n,m}$. The driving signal 34 may take the form of a voltage signal such as, for example, a sinusoidal waveform, a square waveform, other AC/pulsed waveforms or a DC bias voltage. Each pairing of drive and sense electrodes $D_n$, $S_m$ defines an intersection which provides a sensor area $I_{n,m}$, and all of the intersections $I_{n,m}$ may be sequentially sampled to acquire a complete signal frame, for example $F_{full}(n,m,k)$ from the projected capacitance touchscreen panel 22, 23, 28. In this way, both single-touch events and multi-touch events may be registered.

In the absence of a touch event, the drive and second electrodes $D_n$, $S_m$ corresponding to any given intersection $I_{n,m}$ define a baseline mutual capacitance, $C_M$. The frame acquisition module 6 determines the mutual capacitance between the drive and sense electrodes $D_n$, $S_m$ based on the driving signal 34 and the output signal 35. The frame acquisition module 6 may determine the mutual capacitance between the drive and sense electrodes $D_n$, $S_m$ using any known method such as, for example, based on a change in the amplitude, phase or frequency of the driving/output signals 34, 35 compared to a reference signal. Alternatively, the frame acquisition module 6 may determine the mutual capacitance based on the time constant and/or charging/discharging times of the drive and second electrodes $D_n$, $S_m$.

During a touch event, an additional capacitance $C_F$ couples the electrodes and the user's digit 33 or a suitable conductive stylus (not shown). The additional capacitance $C_F$ is in parallel with the baseline self-capacitance $C_S$, resulting in an increment in the total capacitance measured. The magnitude of the additional capacitance $C_F$ during a touch event is not fixed, and may vary depending upon factors such as, for example, the contact area of the user's digit 33 or the suitable conductive stylus.

Whether a projected capacitance touchscreen panel is operated in a self-capacitance of mutual capacitance mode, the signal frame values, for example $F_{down}(n,m,k)$ measured from a projected capacitance touchscreen panel 18, 22, 23, 28 is an array of the values of capacitance measured for each sensor area $I_{n,m}$. When the size of a change in capacitive $C_F$ corresponding to a touch event exceeds a threshold amount, the touch event is registered. The measured capacitance values may include deviations due to noise signals and/or offset values.

Although examples of projected capacitance touchscreen panels 18, 22, 23, 28 using self or mutual capacitance have been described for reference, the first and second methods of processing output signals from touchscreen panels are not limited to projected capacitance touchscreen panels 18, 22, 23, 28 using self or mutual capacitance. For example, first and second methods of processing output signals from touchscreen panels may alternatively be used with touchscreen panels based on measuring different properties such as, for example, electrical resistance or pressure. First and second methods of processing output signals from touchscreen panels may alternatively be used with touchscreen panels based on optical or acoustic methods.

For example, in other types of touchscreen panel the first and second electrodes $X_n$, $Y_m$ may fulfil different roles. When a touchscreen panel 1 is a projected capacitance type, the signal frame values, for example $F_{down}(n,m,k)$, may represent a capacitance or change in capacitance between the drive and sense electrodes $D_n$, $S_m$. Alternatively, when a touchscreen panel 1 is a resistance type, the signal frame values, for example $F_{down}(n,m,k)$, may represent a resistance or change in resistance between the respective electrodes $X_n$, $Y_m$. Alternatively, when a touchscreen panel 1 is a force or pressure sensing type, the signal frame values, for example $F_{down}(n,m,k)$, may represent a pressure or force applied between the respective electrodes $X_n$, $Y_m$. Equally, when a touchscreen panel 1 takes the form of an N by M array of discrete individually addressable sensors, for example such as the first projected capacitance touch panel 18, the frame signal values, for example $F_{down}(n,m,k)$ corresponding to each sensor area $I_{n,m}$ may correspond to a range of different physical parameters measured by the sensor areas $I_{n,m}$. For example, each discrete sensor area $I_{n,m}$ may measure a capacitance, a resistance, a force or pressure or any other suitable physical parameter which undergoes a detectable change in response to a touch event.

In this way, the specific physical parameter represented by the signal frame values, for example $F_{down}(n,m,k)$, measured from a touchscreen panel 1 varies depending on the type of touchscreen panel 1. Regardless of the physical parameter represented by the values measured from sensor areas $I_{n,m}$ the first and second methods of processing output signals from a touchscreen panel may be applied to reduce the energy consumption for acquiring a frame whilst maintaining or even improving the detection accuracy. Where sensor areas $I_{n,m}$ are sampled sequentially, first and second methods of processing out signals may additionally decrease the acquisition interval.

Figure 7:
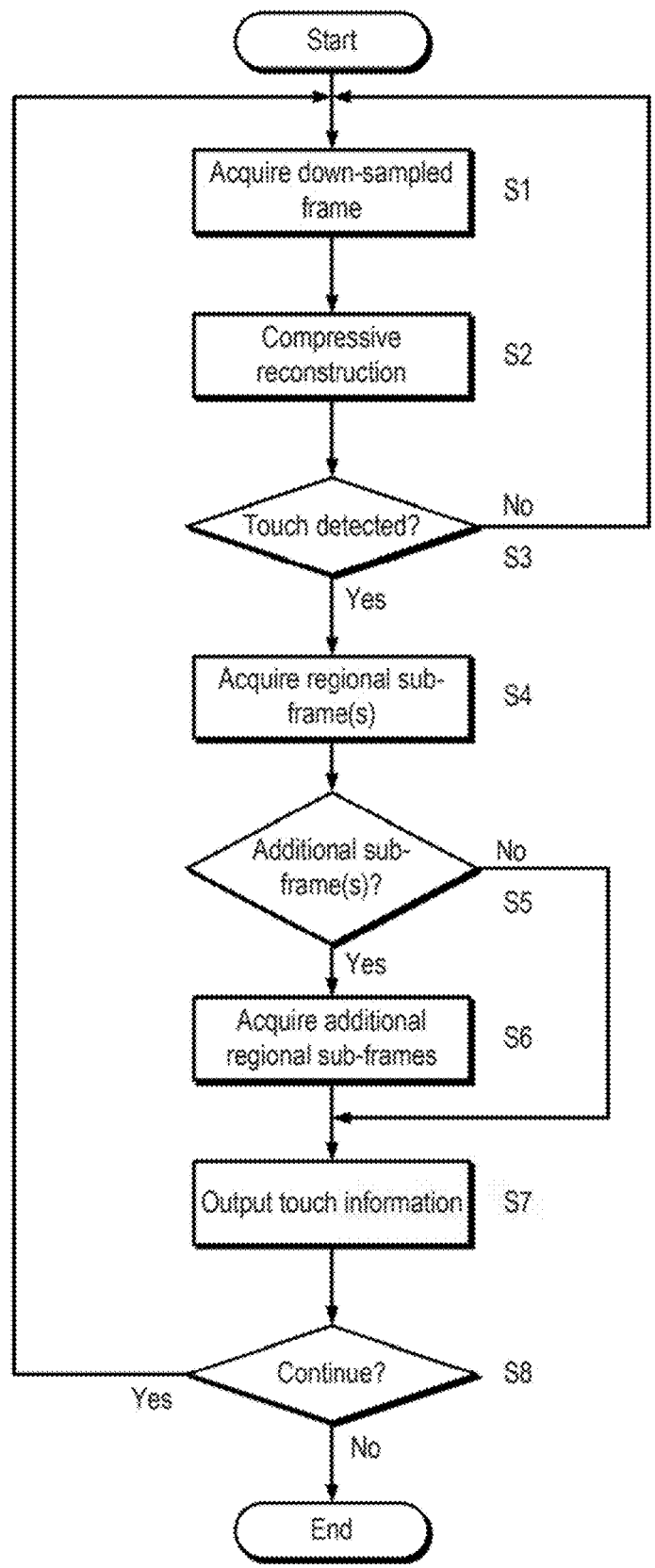
FIG. 7 is a process flow diagram of a first method of processing output signals from a touchscreen panel.

First method of processing output signals from a touchscreen panel: Referring to FIGS. 2 and 7, the first method of processing output signals from a touchscreen panel shall be explained. The frame acquisition module 6 acquires down-sampled, or partial, frame values $F_{down}(n,m,k)$ by sampling a fraction $f_{samp}$ of the total number N×M of sensor areas $I_{n,m}$ (step S1). For example, the self-capacitance of a fraction of the conductive pads 19 of the first capacitive touchscreen panel 18 may be measured. For example, the mutual capacitance may be measured for a fraction of the intersections $I_{n,m}$ between the drive $D_n$ and sense $S_m$ electrodes of the second to fourth capacitive touchscreen panels 22, 23, 28. The sampling fraction $f_{samp}$ may be predetermined or may be adjusted in use depending on the quality of reconstructed frames $F_{recon}(n,m,k)$ generated using the down-sampled frames $F_{down}(n,m,k)$. The frame acquisition module 6 may sample, for example, up to 10%, up to 20%, up to 25%, up to 50%, or up to 75% of the total number of sensor areas $I_{n,m}$. The sampling fraction $f_{samp}$ may be alternatively expressed as fraction such as, for example, ½, ⅓, ¼, ⅑, ⅒ or 1/16.

The sensor areas $I_{n,m}$ to be used for sampling the down-sampled, or partial, frame values $F_{down}(n,m,k)$ may be selected at random. For example, a random or pseudo-random number $0 \le N_{rand} \le 1$ may be generated for each sensor area $I_{n,m}$ and that sensor area will be sampled if the random number $N_{rand}$ is less than or equal to the sampling fraction $f_{samp}$, i.e. if $N_{rand} \le f_{samp}$. Such a procedure does not enforce the sampling fraction $f_{samp}$ strictly. If precise correspondence to the sampling fraction $f_{samp}$ is desired, alternative procedures may be used. For example, a random or pseudo-random number $N_{rand}$ may be generated for each sensor area $I_{n,m}$ and the sensor areas $I_{n,m}$ may be placed in ascending (or descending) order according to the value of the number $N_{rand}$. The sensor area in the $f_{samp} \times N \times M^{th}$ position and those having a lower (or higher) value of $N_{rand}$ may be selected for sampling when acquiring the down-sampled frame values $F_{down}(n,m,k)$. When the touchscreen panel 1 samples sensor areas $I_{n,m}$ by addressing a corresponding first electrode $X_n$ and a corresponding second electrode $Y_m$, arbitrary selection of sensor areas $I_{n,m}$ may result in complex or burdensome addressing of the selected sensor areas $I_{n,m}$. In this case, it may be more efficient to instead make a random selection of an electrode fraction $f_{elec}$ of the first electrodes $X_n$ and $f_{elec}$ of the second electrodes $Y_m$ and to sample the sensor areas $I_{n,m}$ corresponding to the intersections of the selected first and second electrodes $X_n$, $Y_m$. For example, using the second to fourth capacitive touchscreen panels 22, 23, 28, a randomly selected drive electrode $D_n$, is driven, then every one of the $f_{elec}$ randomly selected sense electrodes $S_m$ is sampled before a different drive electrode $D_n$ needs to be addressed. The fraction $f_{elec}$ of first and second electrodes $X_n$, $Y_m$ selected and the corresponding fraction $f_{samp}$ of sensor areas $I_{n,m}$ sampled are related as $f_{samp} = f_{elec} \times f_{elec}$.

The randomised selection need not be conducted every time the frame acquisition module 6 acquires a down-sampled, or partial, frame $F_{down}(n,m,k)$. Instead, sensor areas $I_{n,m}$ to be sampled may be selected upon start-up or when a device incorporating the touchscreen panel wakes from a sleep or low power mode, or according to a predetermined schedule. The frame acquisition module 6 may store a list of the sensor areas to sample when acquiring a down-sampled frame $F_{down}$. When the sampled sensor areas are selected at random, the down-sampled frame values $F_{down}(n,m,k)$ may take the form of an array or matrix. Values of the down-sampled frame $F_{down}(n,m,k)$ which do not correspond to a sampled sensor area $I_{n,m}$ may be initialised to a value of zero, or zeros may be subsequently inserted corresponding to the un-sampled sensor areas $I_{n,m}$. Alternatively, the sampled values may take the form of a listing of the coordinates n, m of sampled sensor areas $I_{n,m}$ and the corresponding values $F_{down}(n,m,k)$.

Alternatively, the pattern of sensor areas $I_{n,m}$ may be fixed, for example by sampling every second sensor area $I_{n,m}$, $I_{n+2,m}$, $I_{n+4,m}$ etc or by sampling every other first electrode $X_n$, $X_{n+2}$, $X_{n+4}$ etc and every other second electrode $Y_m$, $Y_{m+2}$, $Y_{m+4}$ etc, depending on the desired sampling fraction $f_{samp}$. When a regular pattern of sensor areas is sampled, the down-sampled, or partial, frame values $F_{down}(n,m,k)$ may also take the form of an array or matrix having reduced resolution. For example, if every other drive and sense electrode $D_n$, $S_m$ of one of the second to fourth capacitive touchscreen panels 22, 23, 28 were to be sampled, the down-sampled frame down $F_{down}(n,m,k)$ could take the form of an array having dimensions N/2 by M/2.

The signal reconstruction module 7 receives the down-sampled, or partial, frame values $F_{down}(n,m,k)$ and a compressive reconstruction algorithm is applied to generate a corresponding new, reconstructed frame $F_{recon}(n,m,k)$ (step S2). Any suitable compressive reconstruction algorithm may be used such as, for example, the minimum $\ell_1$ norm method. The reconstructed frame values $F_{recon}(n,m,k)$ take the form of an N by M array or matrix, each value or pixel corresponding to relative location of a sensor area $I_{n,m}$ in the array 2.

The touch decision module 8 receives the new, reconstructed frame values $F_{recon}(n,m,k)$ and determines the presence or absence of one or more signals corresponding to touch events (step S3). The touch decision module 8 may determine the presence or absence of touch events by comparing the pixel values of the reconstructed frame values $F_{recon}(n,m,k)$ to a predetermined threshold value. The predetermined threshold may be based on the amplitude of noise signals and/or offset values experienced by the sensor areas $I_{n,m}$. The touch decision module 8 determines an estimated touch location corresponding to each individual touch event registered, for example $n_0$, $m_0$, $n_1$, $m_1$ etc. When a frame corresponds to a multi-touch event, several touch events and corresponding estimated touch locations will be determined. The estimated touch location for a given touch event may be determined as the location of the peak pixel value of the reconstructed frame values $F_{recon}(n,m,k)$ corresponding to the given touch event. Alternatively, the estimated touch location may be determined as the weighted or unweighted centroid of the pixel values corresponding to a given touch event or by interpolating the location of a peak value or by any other suitable method. If no touch events are registered then the frame acquisition module 6 acquires the next down-sampled frame values $F_{down}(n,m,k+1)$ (step S3; No).

The sub-frame acquisition module 9 receives the estimated touch locations, determines region 3 information corresponding to each estimated touch location and instructs the frame acquisition module 6 to sample regional sub-frame values $F_{reg}(n,m,k)$ from one or more regions 3 (step S4). The region 3 information corresponding to a given touch event corresponds to a set of sensor areas $I_{n,m}$ including the location of the sensor area $I_{n,m}$ corresponding to, or closest to, the estimated touch location of the given touch event. For example, if an estimated location is ($n_0$, $m_0$), then a corresponding region 3 may be defined according to $n_0 \pm 1$ and $m_0 \pm 1$. The frame acquisition module 6 acquires regional-frame values $F_{reg}(n,m,k)$ by sampling every sensor area $I_{n,m}$ included within one or more regions 3. In this way, the regional sub-frame(s) $F_{reg}$ have equal resolution to a full resolution frame $F_{full}$ within the sampled regions 3. A regional sub-frame $F_{reg}$ may take the form of an array or matrix of values $F_{reg}(n,m,k)$. An array of regional sub-frame values $F_{reg}(n,m,k)$ may have a size equal to the corresponding region 3, for example, if a region 3 is defined as $n_0 \pm 2$, $m_0 \pm 2$, then an regional sub frame $F_{reg}$ may be a 5 by 5 array. Alternatively, an array of regional sub-frame values $F_{reg}(n,m,k)$ may have a size of N by M and entries which do not correspond to a sampled sensor area $I_{n,m}$ included in one or more sampled regions 3 may be initialised or assigned to a value of zero. Alternatively, a regional sub-frame $F_{reg}$ may take the form of a listing of coordinates n, m and the corresponding values $F_{reg}(n,m,k)$. For multi-touch events, the sub-frame acquisition module 9 may instruct the frame acquisition module 6 to acquire a single regional sub-frame $F_{reg}(n,m,k)$ by sampling multiple regions 3 or may instruct the frame acquisition module 6 to acquire multiple regional sub-frames $F_{reg}$, each acquired by sampling sensor areas $I_{n,m}$ within a different region 3.

The estimated touch location of a given touch event may be different from the actual location by a displacement $\Delta d$. This displacement $\Delta d$ may arise from the process of reconstructing the frame $F_{recon}$ from the down-sampled frame $F_{down}$ and may vary with the amplitude of noise signals and the fraction of sensor areas sampled $f_{samp}$. The displacement $\Delta d$ may be considered in units of pixels, for example, between the values $F_{recon}(n,m,k)$ and $F_{recon}(n+1,m,k)$, which is approximately equivalent to the separation between adjacent sensor areas. One pixel corresponds approximately to the physical separation s between adjacent sensor areas $I_{n,m}$. The sizes of the regions 3 used to acquire the regional sub-frame(s) $F_{reg}$ may depend on the typical size of the displacement $\Delta d$ for a given sampling fraction $f_{samp}$. For example, if a typical maximum displacement is one pixel or less, then a region 3 having a side length of two pixels and centred on the estimated touch location may be used. For example, if an estimated location is ($n_0$,$m_0$), then a corresponding region 3 may be defined according to $n_0 \pm 1$ and $m_0 \pm 1$, i.e. a total of nine sensor areas $I_{n,m}$ would be sampled. The typical maximum displacement $\Delta d$ for a given sampling fraction $f_{samp}$ may be pre-calibrated and/or determined in use by the sub-frame acquisition module 9 by comparing the estimated touch locations from the reconstructed frame values $F_{recon}(n,m,k)$ with touch locations determined using the regional sub-frame(s) values $F_{reg}(n,m,k)$. The size of the regions 3 used for a given sampling fraction $f_{samp}$ may be predetermined. Alternatively, the size of the regions 3 used for a given sampling fraction $f_{samp}$ may be adjusted by the sub-frame acquisition module 9 in dependence upon displacements $\Delta d$ determined in use. Further details of the sizes of regions 3 are discussed in relation to experimental data and simulations using an experimental capacitive touch test bed.

The sub-frame acquisition module 9 determines whether to acquire one or more additional sub-frames $F_{add}$ (step S5). If one or more additional sub-frames $F_{add}$ are desired, then the sub-frame acquisition module 9 instructs the frame acquisition module 6 to sampled the additional sub-frame(s) values $F_{add}(n,m,k)$ (step S6). One example of when additional sub-frames $F_{add}(n,m,k)$ may be acquired is for a touchscreen system 4 in which sensor areas $I_{n,m}$ are sampled sequentially. For example, when the second to fourth capacitive touchscreen panels 22, 23, 28 are operated to measure mutual capacitances at intersections of drive and sense electrodes $D_n$, $S_m$. In this case, it may be possible to acquire one or more additional sub-frames $F_{add}$ in the same time or less time than the acquisition interval $\Delta T_{acq}$ for a single full resolution frame $F_{full}$. The regional sub-frame(s) values $F_{reg}(n,m,k)$ and additional sub-frame(s) values $F_{add}(n,m,k)$ may be averaged to reduce the amplitude of uncorrelated noise signals and improve detection accuracy compared to full resolution frame values $F_{reg}(n,m,k)$. Another example is if the displacement $\Delta d$ is larger than expected and the sub-frame acquisition module 9 needs further information from additional sensor areas $I_{n,m}$ in order to determine or interpolate the touch event location. In this latter case, the sub-frame acquisition module 9 may instruct the frame acquisition module 6 to acquire additional sub-frame(s) values $F_{reg}(n,m,k)$ using an enlarged and/or re-located region 3.

The sub-frame acquisition module 9 may also determines the locations of the registered touch events in dependence upon the regional sub-frame(s) values $F_{reg}(n,m,k)$ and/or the additional sub-frame(s) values $F_{add}(n,m,k)$.

The communications module 10 receives locations of touch events and/or the regional sub-frame(s) $F_{reg}$ and/or the additional sub-frames $F_{add}$ and outputs touch information 16 to the device central processing unit (CPU) 17 (step S7). The touch information may be used, for example, by an application or operating system being executed by the device CPU 17 to select an option, open a folder on desktop or to close a web browser application. The touch information 16 may include locations of the touch events, if calculated by the sub-frame acquisition module 9. Alternatively, the touch information 16 may include one or more regional sub-frames $F_{reg}$ and/or one or more additional sub-frames $F_{add}$ and if appropriate information defining the locations and extent of the corresponding regions 3. The device CPU 17 may determine the locations and/or shapes of touch events directly from the regional and/or additional sub-frames $F_{reg}$, $F_{add}$.

Whilst the touchscreen system 4 continues operating (step S8), the next down-sampled frame values $F_{down}(n,m,k)$ is acquired.

The steps occurring between sampling down-sampled frame values $F_{down}(n,m,k)$ and sampling subsequent down-sampled frame values $F_{down}(n,m,k+1)$ (steps S1 to S8) are preferably conducted in less time than a desired acquisition interval. However, when frames should be acquired during display quiet/blanking periods, then the steps occurring between sampling down-sampled, or partial, frame values $F_{down}(n,m,k)$ and sampling subsequent down-sampled, or partial, frame values $F_{down}(n,m,k+1)$ (steps S1 to S8) should preferably take place within the display quiet/blanking periods.

Acquiring a corresponding regional sub-frame $F_{reg}$ including or centred at the estimated touch location enables the location of the touch event to be determined with the same level of accuracy as would be obtained using a full resolution frame $F_{full}$. However, the total number of sensor area $I_{n,m}$ sampling operations for the down-sampled frame $F_{down}$ and the regional sub-frame(s) $F_{reg}$ may be less or substantially less than the total number N×M of sensor area $I_{n,m}$ sampling operations for acquiring a full resolution frame $F_{full}$. In this way, the energy consumption of a touchscreen system 4 may be reduced whilst maintaining the detection accuracy. When sensor areas $I_{n,m}$ are sampled sequentially, the first method of processing output signals from a touchscreen panel may also decrease the acquisition interval and improves responsivity.

When sensor areas $I_{n,m}$ are sampled sequentially, the first method of processing output signals may also improve the detection accuracy by averaging the regional sub-frame(s) values $F_{reg}(n,m,k)$ and the one or more sets of additional sub-frame(s) values $F_{add}(n,m,k)$ to reduce the amplitude of uncorrelated noise signals. When sensor areas $I_{n,m}$ are sampled substantially simultaneously, for example if the sensor areas $I_{n,m}$ correspond to discrete sensors such as the conductive pads 19 of the first capacitive touchscreen panel 18, the regional sub-frame(s) values $F_{reg}(n,m,k)$ may still be averaged with one or more additional sub-frame(s) values $F_{add}(n,m,k)$ to improve detection accuracy if the extra time for acquiring the additional sub-frame(s) $F_{add}(n,m,k)$ does not decrease responsivity below a threshold for user perceptibility.

Projected capacitance test bed: The use of the first method of processing output signals from a touchscreen panel may be illustrated with reference to experiments conducted using an example of a projected capacitance touchscreen panel, also referred to as the "experimental test bed". Referring to FIGS. 4A to 4C and FIG. 20, experiments were conducted using an example touchscreen system in the form of an experimental capacitive test bed having eighty first electrodes $X_n$ in the form of drive electrodes $D_n$ (also referred to as transmission or "Tx" electrodes) and eighty second electrodes $Y_m$ in the form of sense electrodes $S_m$ (also referred to as receiving or "Rx" electrodes). The experimental capacitive test bed used drive and sense electrodes $D_n$, $S_m$ configured in a grid forming an array 2 of sensor areas $I_{n,m}$. The experimental capacitive test bed included relatively wide drive electrodes $D_n$ and relatively narrow sense electrodes $S_m$ deposited on the same surface and perpendicular to the drive electrodes $D_n$. At each intersection $I_{n,m}$ the drive electrodes $D_n$ tapered to a waist, and the sense electrodes $S_m$ bridged the drive electrode $D_n$ waists by means of jumpers. The experimental touchscreen panel was rectangular, with a diagonal dimension of 10.1 inches (25.7 cm) and had an aspect ratio of 16:9. The excitation voltage for the drive electrodes $D_n$ was 10 V. The drive electrodes $D_n$ had a width of 3 mm. The portions of the sense electrodes $S_m$ which overlapped the drive electrodes $D_n$ had a maximum width of 449 μm. The sensor areas $I_{n,m}$ formed by intersection of the drive and sense electrode $D_n$, $S_m$ had an active area $A_s$ of 3 mm by 3 mm and sensor areas $I_{n,m}$ were spaced apart with gaps of 2 mm, i.e. s=$_5$ mm. Full resolution frames could be acquired at a acquisition frequencies of $f_s$=30 Hz or $f_s$=60 Hz. The pixels of a display underlying the example touchscreen panel had dimensions of 56 μm by 56 μm.

Experimental and simulation results implying the first method: Referring to FIGS. 2, 7 and 20, the first method of processing output signals from a touchscreen panel was assessed using simulations based on full resolution frames $F_{full}$ acquired using the experimental test bed. Down-sampled frames values $F_{down}(n,m,k)$ were obtained by sampling a fraction $f_{samp}$ of the pixel values from experimentally obtained full resolution frame values $F_{full}(n,m,k)$. A minimum $\ell_1$ norm compressive construction algorithm was applied to the down-sampled frame values $F_{down}(n,m,k)$ thus obtained. In this way, the first method of processing output signals from a touchscreen panel could be simulated in way which allowed direct comparison of the estimated touch locations determined from the reconstructed frame values $F_{recon}(n,m,k)$ and the touch locations obtained using full resolution frame values $F_{full}(n,m,k)$. Using this approach, it is also possible to directly compare the effects of different parameters of the first method.

Randomised selection of sensor areas: In a first set of simulations, a given sampling fraction $f_{samp}$ of frame the full resolution values $F_{full}(n,m,k)$ were sampled at random. Monte Carlo simulations were conducted for three values of the sampling fraction, 10%, 30% and 50%, including moo simulations in each set. This is approximately analogous to the first method when sensor areas $I_{n,m}$ are selected at random. Referring also to FIG. 3, random selection of sensor areas $I_{n,m}$ may be most appropriate when sensor areas $I_{n,m}$ are discrete sensor areas, for example, the conductive pads 19 of the first projected capacitance touchscreen panel 18.

Figure 8A:
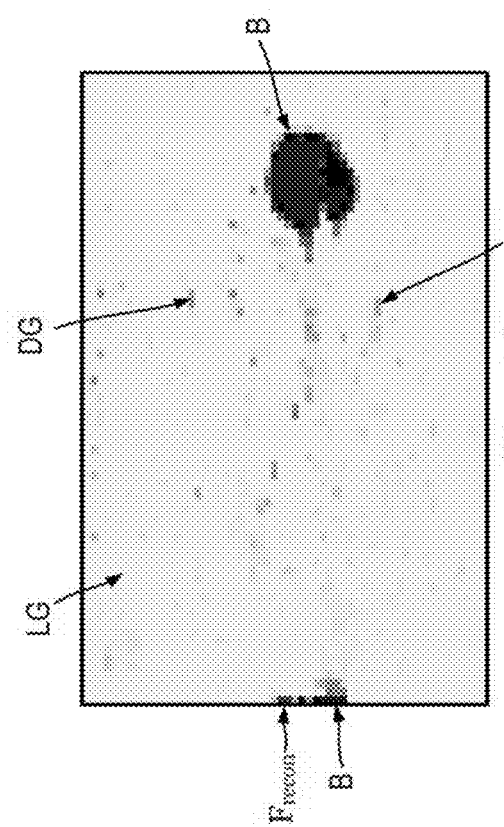
FIGS. 8A to 8D illustrate processing of output signals according to a first method of processing output signals from a touchscreen panel with random selection of sensor areas from an array of touch panel sensor areas.

Referring also to FIG. 8A, a full resolution frame $F_{full}$ corresponding to a single touch event is shown. In grayscale plots illustrating frames, regions labelled "LG" correspond to low signal levels, regions labelled "DG" correspond to intermediate signal levels and regions labelled "B" correspond to high signal level.

Figure 8B:
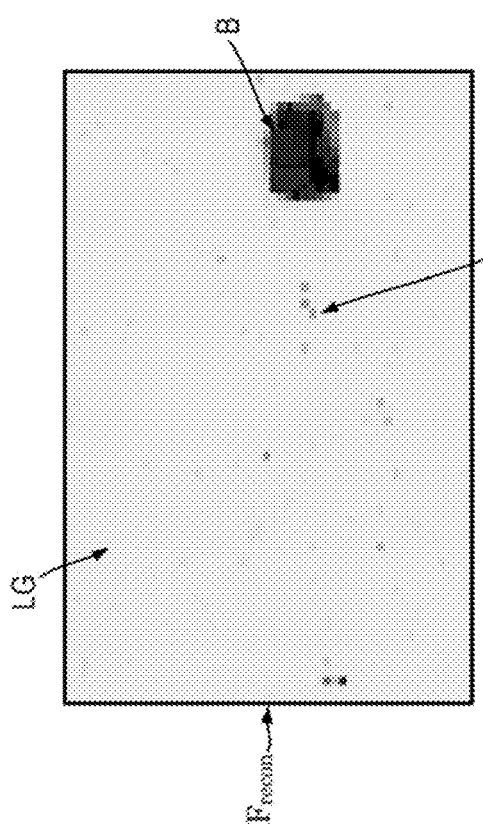
Figure 8C:
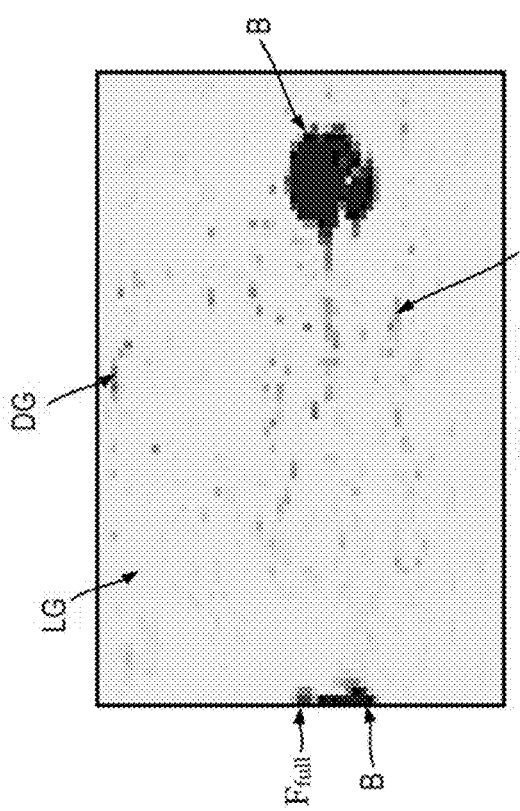
Figure 8D:
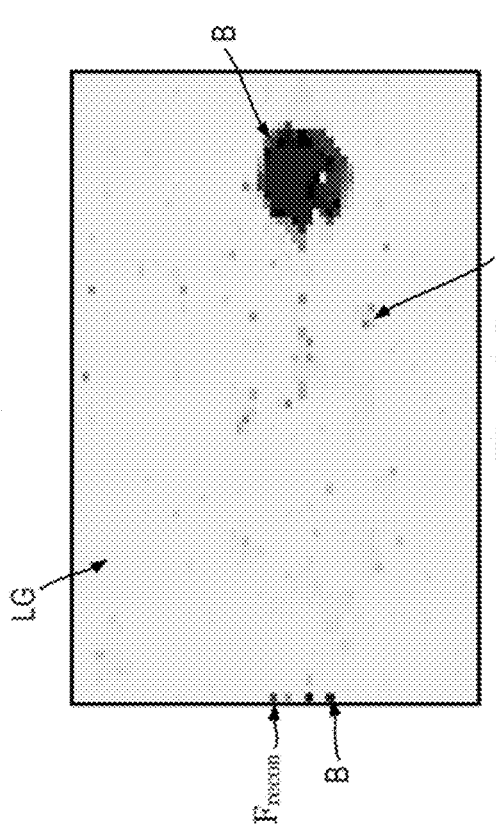

Referring also to FIGS. 8B, 8C and 8D, reconstructed frames $F_{recon}$ corresponding to the same single touch event are shown corresponding respectively to sampling fractions $f_{samp}$ of 50%, 30% and 10% are shown. As might be expected, the lowest sampling fraction, $f_{samp}$=10%, had the highest probability of poor quality in the reconstructed frame $F_{recon}$.

Figure 9:
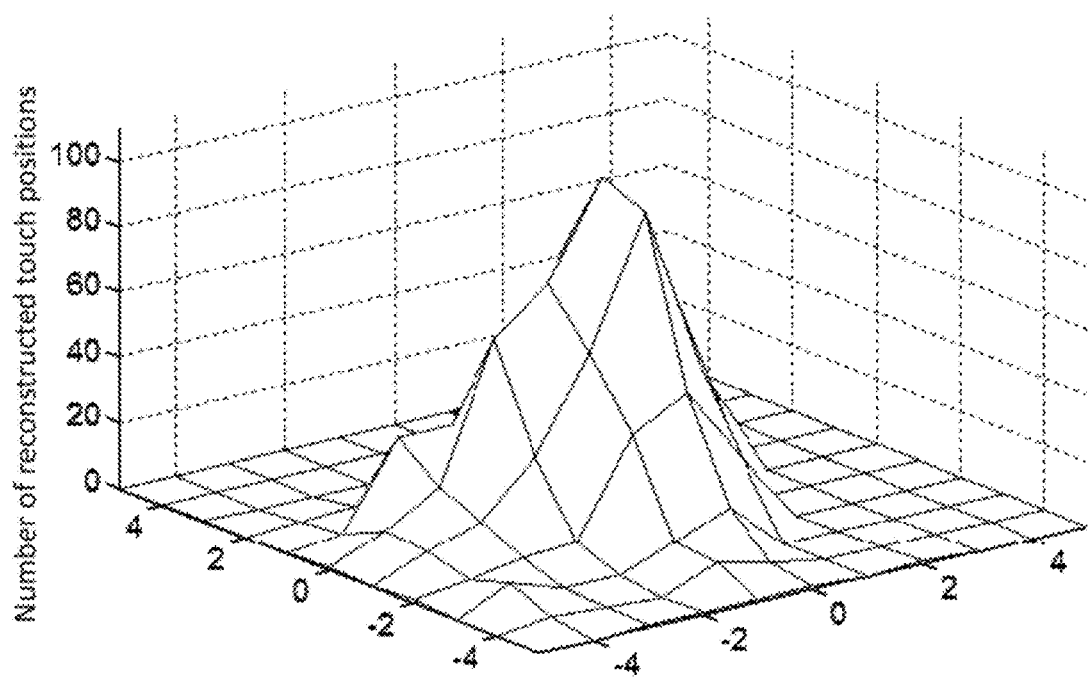
FIG. 9 shows a simulated distribution of displacements between estimated and original locations of touch events for a first method of processing output signals from a touchscreen panel.

Referring also to FIG. 9, the relative displacements Δd of the estimated touch positions determined using the reconstructed frame values $F_{recon}(n,m,k)$ approximately follow a Gaussian (or normal) distribution for the simulation set with $f_{samp}$=10%.

Figure 10:
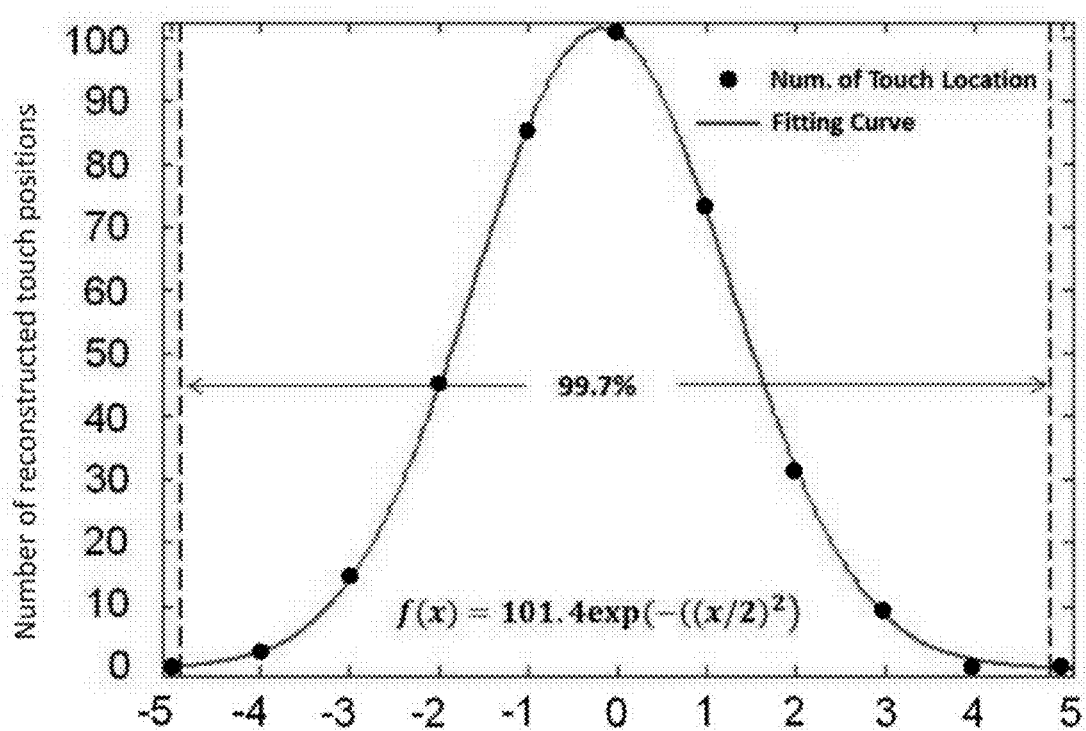
FIG. 10 shows a Gaussian distribution fitted to a simulated distribution shown in FIG. 9.

Referring also to FIG. 10, the cross section of the observed Gaussian distribution having the largest variance was used to fit parameters for a model Gaussian distribution:

$$f(\Delta d) = 101.4\exp\left(-\left(\frac{\Delta d}{2}\right)^2\right)$$

In which $\Delta d$ is the displacement between the estimated touch location determined based on the reconstructed frame values $F_{recon}(n,m,k)$ and the touch location determined using corresponding full resolution frame values $F_{full}(n,m,k)$. Thus, if the maximum displacement $\Delta d$ is taken to be the 99.7% probability bound, the maximum displacement is 5 pixels when the simulated sampling fraction $f_{samp}=10\%$, is used based on 1000 Monte Carlo simulations. Performing the same analysis for the simulation sets corresponding to $f_{samp}=30\%$ and $f_{samp}=50\%$, the maximum displacements $\Delta d$ were 4 and 3 pixels respectively. Higher sampling fractions $f_{samp}$ appear to provide increased probability of smaller displacements $\Delta d$ of the estimated touch locations.

The dimensions of regions 3 within which sensor areas $I_{n,m}$ are sampled when acquiring regional sub-frame values $F_{reg}(n,m,k)$ should be set to maximise the probability that the regions 3 will include the actual touch location. For example, the dimension for a region 3 may be set to two times the expected maximum displacement $\Delta d$ corresponding to the sampling fraction $f_{samp}$ in use. The number $N_{reg}$ of sensor areas $I_{n,m}$ sampled within such a region 3 may be expressed as:

$$N_{reg}=(2\Delta d+1)^2$$

in which $N_{reg}$ is the number of sensor areas $I_{n,m}$ within a region 3 and $\Delta d$ is the displacement of the estimated touch location.

In the experimental capacitive test bed the total number of sensor areas $I_{n,m}$ is 80×80=6,400. Application of the first method using a sampling fraction of $f_{samp}=10\%$, requires sampling 640 sensor areas to acquire the down-sampled frame values $F_{down}(n,m,k)$. In such a case, based on Equation (7) and the maximum expected displacement $\Delta d=5$ pixels, the regional sub-frame $F_{reg}(n,m,k)$ corresponding to a single touch event requires sampling another 121 sensor areas $I_{n,m}$. Consequently, the total number of sensor area $I_{n,m}$ sampling operations is 761, which is less than 12% of the number for a single full resolution frame $F_{full}$.

For a multi-touch event, the total number $N_{total}$ of sensor area $I_{n,m}$ sampling operations may be expressed as:

$$N_{total}=N_{down}+N_{touch}\times N_{reg}$$

$$N_{down}=f_{samp}\times(N\times M)$$

in which $N_{total}$ is the number of sensor areas $I_{n,m}$ sampled according to the first method, $N_{down}$ is the number of sensor areas sampled to acquire down-sampled frame values $F_{down}(n,m,k)$, $N_{touch}$ is the number of touch events, $N_{touch}\geq 0$, $N_{reg}$ is the number of sensor areas $I_{n,m}$ within a region 3 for acquiring regional sub-frame values $F_{reg}(n,m,k)$, $f_{samp}$ is the sampling fraction, N is the size of the array 2 of sensor areas $I_{n,m}$ in first direction x and M is the size of the array 2 of sensor areas $I_{n,m}$ in a second direction y.

Referring also to FIG. 21, the number $N_{down}$ of sensor areas $I_{n,m}$ sampled to acquire the down-sampled frame values $F_{down}(n,m,k)$ increases in proportion to the sampling fraction $f_{samp}$. In contrast, using Equation (7) and the experimentally evaluated expected maximum displacements $\Delta d$, the number $N_{reg}$ of sensor areas $I_{n,m}$ sampled to acquire the regional sub-frame(s) values $F_{reg}(n,m,k)$ decreases with increasing sampling fraction $f_{samp}$.

The first method of processing output signals from a touch panel may be preferable for larger or higher resolution touchscreen panels 1 including larger numbers of sensor areas $I_{n,m}$. For small touchscreen panels 1 including a relatively low number of sensor areas $I_{n,m}$, there is a possibility that the number of sensor areas $I_{n,m}$ sampled for the first method may exceed the number for a full resolution frame $F_{full}$ when a multi-touch event including a large number (e.g. four or more) simultaneous touch events occurs.

Randomised selection of rows and columns: As previously explained, random selection of individual sensor areas may be less efficient for touchscreen panels which sample a given sensor area $I_n$ by addressing a corresponding first electrode $X_n$ and a corresponding second electrode $Y_n$. For example, by measuring a mutual capacitance between drive and sense electrodes $D_n$, $S_m$ in the second to fourth projected capacitance touchscreen panels 22, 23, 28. In some cases, it may be preferable to randomly select an electrode fraction $f_{elec}$ of the first electrodes $X_n$ and a fraction $f_{elec}$ of the second electrodes $Y_m$, where $f_{samp}=f_{elec}\times f_{elec}$. For example, if 50% of the first electrodes $X_n$ are selected and 50% of the second electrodes are selected then approximately 25% of sensor areas $I_{n,m}$ will be sampled when acquiring the down-sampled frame values $F_{down}(n,m,k)$.

However, randomly selecting $f_{elec}=50\%$ of the first and second electrodes $Y_n$ is not necessarily equivalent to randomly selecting $f_{samp}=25\%$ of the sensor areas $I_{n,m}$, since in the former case the 25% of sensor areas $I_{n,m}$ may span fewer values of n and m overall. Similar simulations to the case of randomly selected sensor areas $I_{n,m}$ were performed for electrode fractions $f_{elec}$ of 75%, 50% and 25%.

Figure 11:
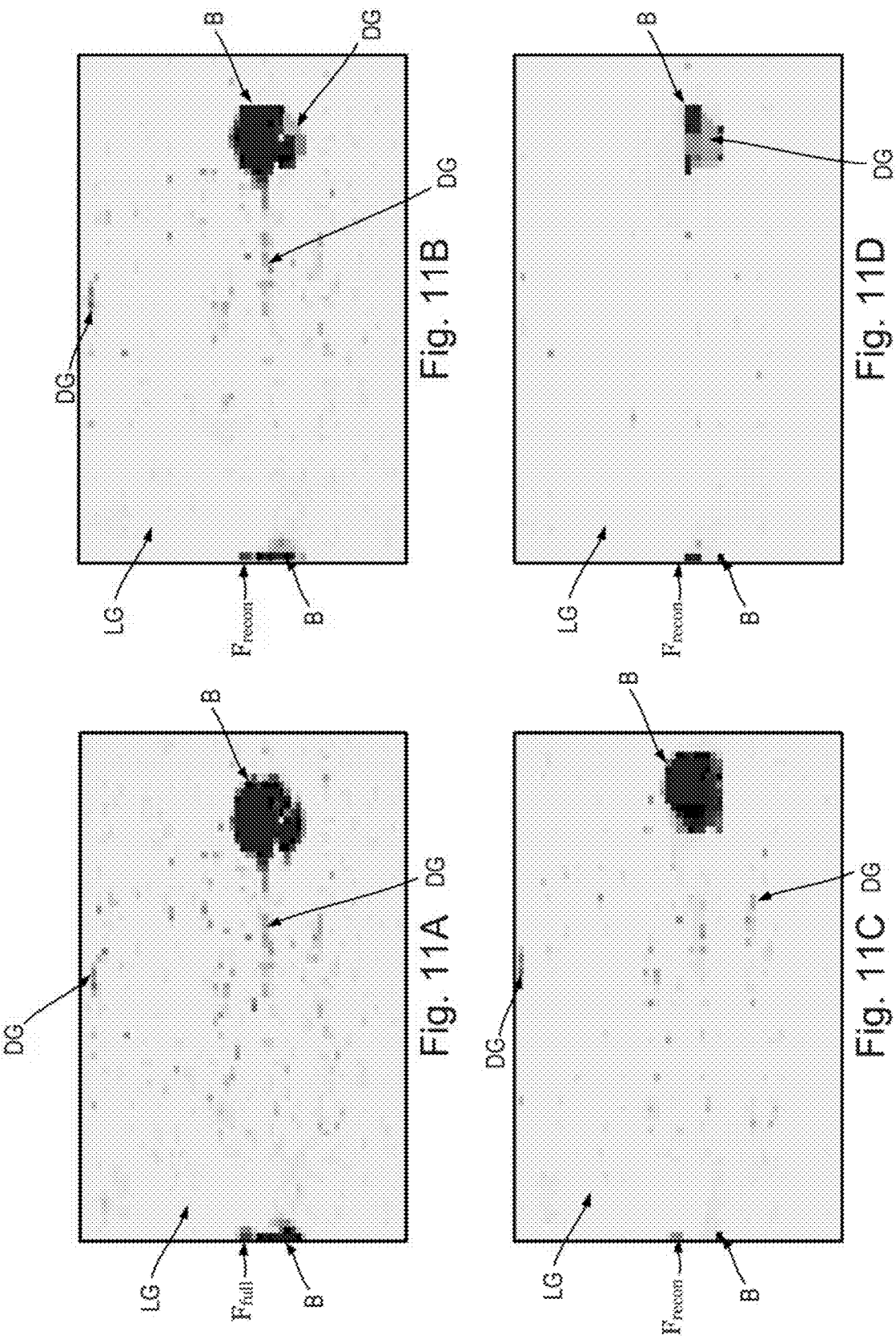
FIGS. 11A to 11D illustrate processing of output signals according to a first method of processing output signals from a touchscreen panel with random selection of rows and columns of an array of touch panel sensor areas.

Referring to FIG. 11A, an example of a full resolution frame $F_{full}$ used for simulating the first method is shown. In grayscale plots illustrating frames, regions labelled "LG" correspond to low signal levels, regions labelled "DG" correspond to intermediate signal levels and regions labelled "B" correspond to high signal level.

Referring also to FIGS. 11B, 11C and 11D, reconstructed frames $F_{recon}$ corresponding to the same single touch event are shown corresponding to electrode fractions of $f_{elec}$ of 75%, 50% and 25% respectively. The reconstructed frame values $F_{recon}(n,m,k)$ corresponding to $f_{elec}=25\%$ are of insufficient quality when the first method is applied to the example of the experimental capacitive test bed. The reconstructed frame values $F_{recon}(n,m,k)$ corresponding to $f_{elec}=25\%$ corresponds approximately to a sampling fraction of $f_{samp}=6.25\%$. Applying the same analysis used to estimate the maximum likely displacements $\Delta d$ for random selection of sensor areas $I_{n,m}$, the maximum displacements for electrode fractions $f_{elec}=50\%$ and $f_{elec}=75\%$ were found to be 4 pixels and 3 pixels respectively.

Example of the time and energy budget for the first method: Referring to FIGS. 7, 20 and 21, the time and energy budget for the first method of processing output signals from a touchscreen panel is described with reference to the example of the experimental capacitive test bed. Values are specific to the experimental test bed and will need to be calculated separately using appropriate parameters for other examples of different touchscreen panels and touchscreen panels measuring other parameters such as resistance or pressure.

If the compressive reconstruction algorithm used is the minimum $f$, norm method, the computation complexity scales as $O(N_{total}\log_2(N_{total}))$, which indicates that approximately 80,000 multiplications are needed to obtain a reconstructed frame $F_{recon}(n,m,k)$ for the experimental test bed. For a GHz range processor, the calculation time is about 80 µs. Compared to the time of a shorter touch event, for example of the order of 0.1 seconds for a short tap, and a typical acquisition interval $\Delta T_{acq}$, for example approximately 17 ms, the calculation time can be neglected.

Commercially available embedded processors may achieve power efficiency over 20 MIPS/mW, which means that the power consumption may be of the order of 25 µW. By way of comparison, the energy cost δE for sampling one sensor area $I_{n,m}$ is approximately ⅓₀ µJ. For the experimental test bed, the power consumption is around 12.8 mW for an acquisition frequency of 60 Hz. Therefore the power consumption of the compressive sensing reconstruction is relatively insignificant. If the acquisition frequency $f_s$ is maintained at 60 Hz and $f_{samp}$=30% of sensor areas $I_{n,m}$ are sampled, then around 8.79 mW can be saved for the example of the experimental test bed.

When the sensor areas $I_{n,m}$ of the touchscreen panel 1 are sampled sequentially, the first method may allow multiple regional sub-frames $F_{reg}$ to be acquired whilst maintaining or increasing the responsivity compared to acquiring full resolution frames $F_{full}(n,m,k)$. Taking an average of regional sub-frame values $F_{reg}(n,m,k)$ and one or more additional sub-frame values $F_{add}(n,m,k)$ reduces the amplitude of uncorrelated noise signals and may improve detection accuracy. For the example of the described experimental test bed, with N=M=80 and an acquisition frequency of $f_s$=60 Hz, the acquisition interval is approximately 16.7 ms, and the time interval for sampling a sensor area $I_{n,m}$ is approximately δt=2.6 µs. If a sampling fraction of $f_{samp}$=50% is used, then acquiring the down-sampled frame values $F_{down}(n,m,k)$ and processing them to generate the reconstructed frame values $F_{recon}(n,m,k)$ takes roughly 8.4 ms. If one touch event occurs, then the corresponding time for acquiring the regional sub-frame values $F_{reg}(n,m,k)$ is approximately 0.2 ms. Up to 40 additional sub-frames $F_{add}$ could be acquired within the $\Delta T_{acq}$=16.7 ms acquisition interval for acquiring a full resolution frame $F_{full}$. When multi-touch events occur, fewer additional regional sub-frames may be acquired within the original acquisition interval $\Delta T_{acq}$. The relationship between the time interval for acquiring full resolution frame values $F_{full}(n,m,k)$ and the time interval for the first method may be expressed as:

$$\Delta T_{full} \geq \Delta T_{down} + N_{touch} N_{reg} \delta t$$

In which $\Delta T_{full}$=δt×N×M is the time interval to acquire a full resolution frame $F_{full}$, $\Delta T_{down}=f_{samp}$×δt×N×M is the time interval to acquire the down-sampled frame values $F_{down}(n,m,k)$, $N_{touch}$ is the number of simultaneously observed touch-events, $N_{reg}$ is the number of sensor areas $I_{n,m}$ sampled in regions 3 corresponding to each touch event and δt is the time interval to sample one sensor area $I_{n,m}$.

Figure 12:
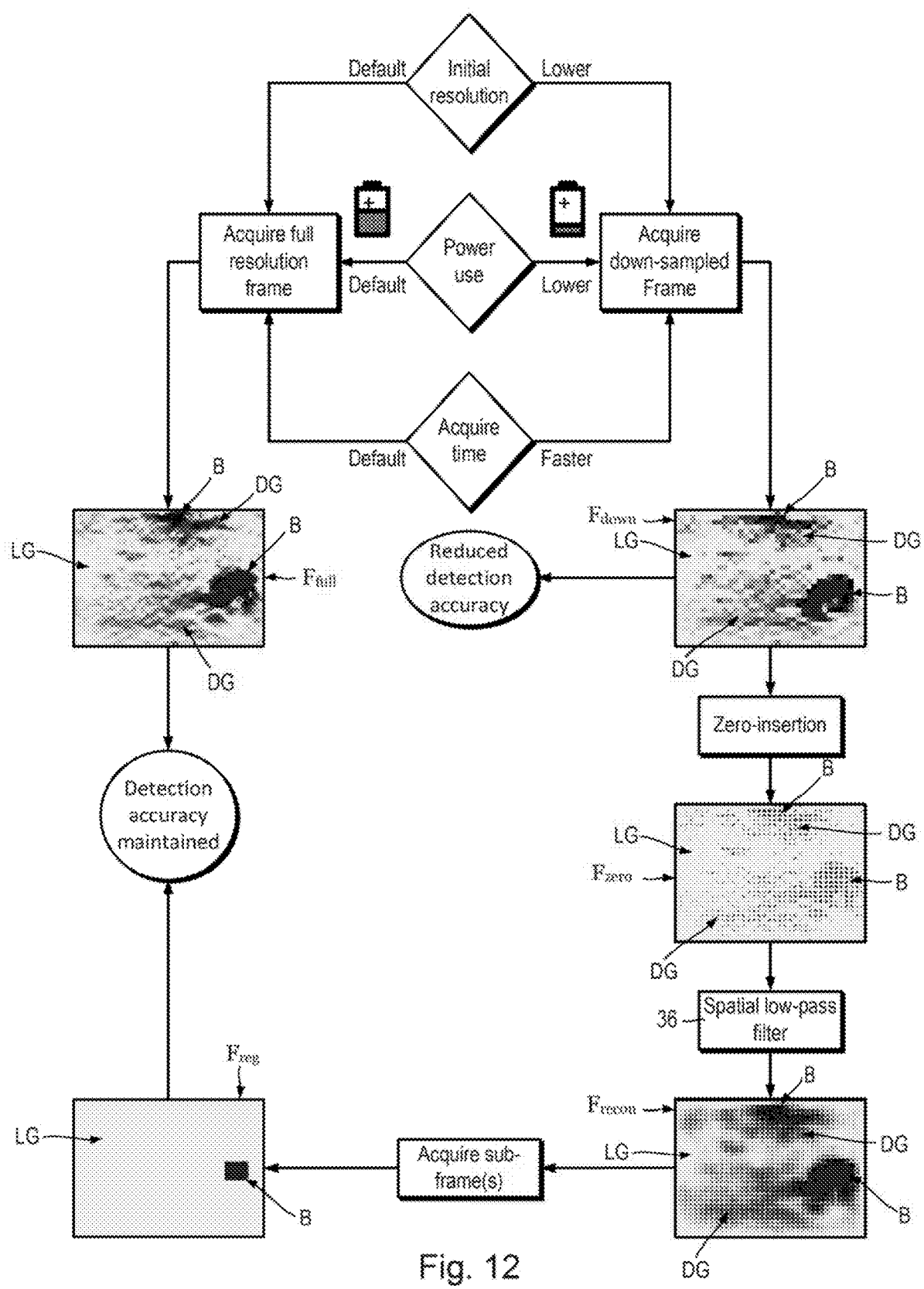
FIG. 12 illustrates down-sampling and reconstruction of output signals from a touchscreen panel using spatial low-pass filtering.
Figure 14:
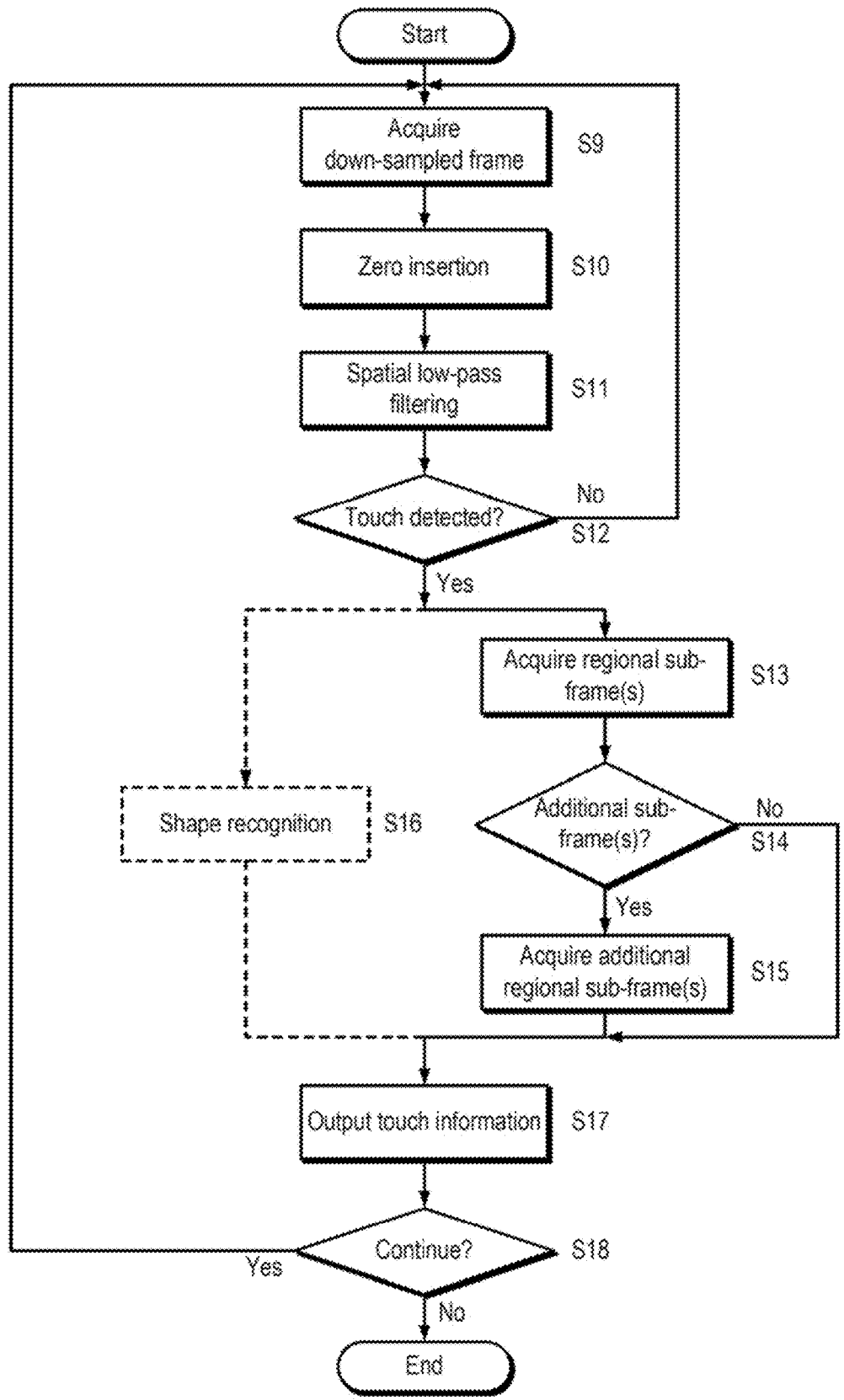
FIG. 14 is a process flow diagram of a second method of processing output signals from a touchscreen panel.

Reconstruction using spatial low pass filtering: Referring to FIGS. 2 and 12, instead of compressive sensing methods, output signals from a touchscreen panel 1 having a number of sensor areas $I_{n,m}$ may be processed using spatial low-pass filtering to reduce the energy consumption for acquiring a touch signal frame and/or the time for acquiring the touch signal frame may be decreased whilst maintaining or even improving the detection accuracy.

A down-sampled, or partial, frame $F_{down}$ is acquired in the same way as for the first method of processing output signals from a touchscreen panel, except that the sensor areas $I_{n,m}$ sampled when acquiring a down-sampled frame $F_{down}$ are preferably selected according to a fixed pattern for spatial low-pass filtering. When a fixed pattern of sensor areas $I_{n,m}$ are sampled, the down-sampled frame values $F_{down}(n,m,k)$ may take the form of an array of matrix having reduced resolution compared to a full resolution frame $F_{full}$. Alternatively, the sensor areas $I_{n,m}$ sampled when acquiring a down-sampled frame $F_{down}$ may be selected at random in the same way as for compressive sensing methods and may take the same form, e.g. arrays or matrices or lists.

A zero insertion process is applied to the down-sampled, or partial, frame $F_{down}$ to generate a zero-inserted, or intermediate, frame $F_{zero}$ having the same resolution as a full resolution frame $F_{full}$. For example, if a touchscreen panel 1 includes an N by M grid 6 of sensor areas $I_{n,m}$, then the zero-inserted frame has a size of N by M pixels. If the sampling fraction is $f_{samp}$=0.25, selected according to a fixed pattern by, for example, sampling every other row and column of sensor areas $I_{n,m}$, then the down-sampled frame will have resolution N/2 by M/2.

In the alternative case that the sensor areas $I_{n,m}$ for acquiring the down-sampled, or partial, frame $F_{down}$ are randomly selected, the explicit step of zero insertion may be omitted. Instead, the down-sampled frame values $F_{down}(n,m,k)$ may be initialised in the form of an N by M array with all entire equal to zero, then populated with non-zero values by sampling the randomly selected sensor areas $I_{n,m}$, or by inserting the values from a listing of down-sampled frame values $F_{down}(n,m,k)$ and corresponding locations n, m.

A new, spatial low-pass filtered (SLPF) frame $F_{SLPF}(n,m,k)$ is generated by applying a spatial low-pass filter 36 to the zero-inserted, or intermediate, frame $F_{zero}(n,m,k)$. The spatial low-pass filter 36 recovers the spatial low frequency properties of signals corresponding to touch events. The filtered frame $F_{SLPF}$ is used to identify estimated locations of touch events. The filtered frame $F_{SLPF}$ may also be used to estimate the approximate shape and extent of a region corresponding to a touch event.

In the similar way to compressive sensing methods, the estimated touch event locations determined using the filtered frame $F_{SLPF}$ may be different to the original locations because of blurring by the spatial low-pass filter 36. In the same way as for compressive sensing methods, the detection accuracy of the second method may be maintained or improved compared to a full resolution frame $F_{full}$ by acquiring one or more regional sub-frames $F_{reg}$ and optionally one or more additional sub-frames $F_{add}$.

In this way, the detection accuracy of locations of touch events may be maintained whilst the energy consumption is decreased. This is possible because the total number of sampling operations to acquire the down-sampled frame $F_{down}$ and the regional sub-frame(s) $F_{reg}$ may be less than the total number of sensor areas $I_{n,m}$. This may be especially significant when a touchscreen panel 1 includes a large number of sensor areas $I_{n,m}$. When a touchscreen panel 1 samples sensor areas $I_{n,m}$ sequentially, the acquisition interval may also be reduced and responsivity correspondingly improved. When a touchscreen panel 1 samples sensor areas substantially simultaneously, the spatial low-pass filtering and the obtaining of sub-frames $F_{reg}$, $F_{add}$ may be fast enough to maintain the responsivity above a threshold of user perceptibility.

In the same way as for compressive sensing methods, additional sub-frames $F_{add}$ may be sampled to allow averaging and reduction of the amplitude of uncorrelated noise signals.

Additionally, the application of the spatial low-pass filter 36 may further reduces noise signals having a high spatial frequency such as, for example, noise spikes.

Spatial low-pass filters: Before explaining the second method of processing output signals from a touchscreen panel in detail, and without wishing to be bound by theory, it may be helpful to briefly discuss the properties of spatial low pass filters. Spatial low pass filters may be broadly characterised as linear filters or non-linear filters. Linear filters include filter types such as average filters and Gaussian filter. Non-linear filters include filter types such as median filters.

Figures 13A, 13B:
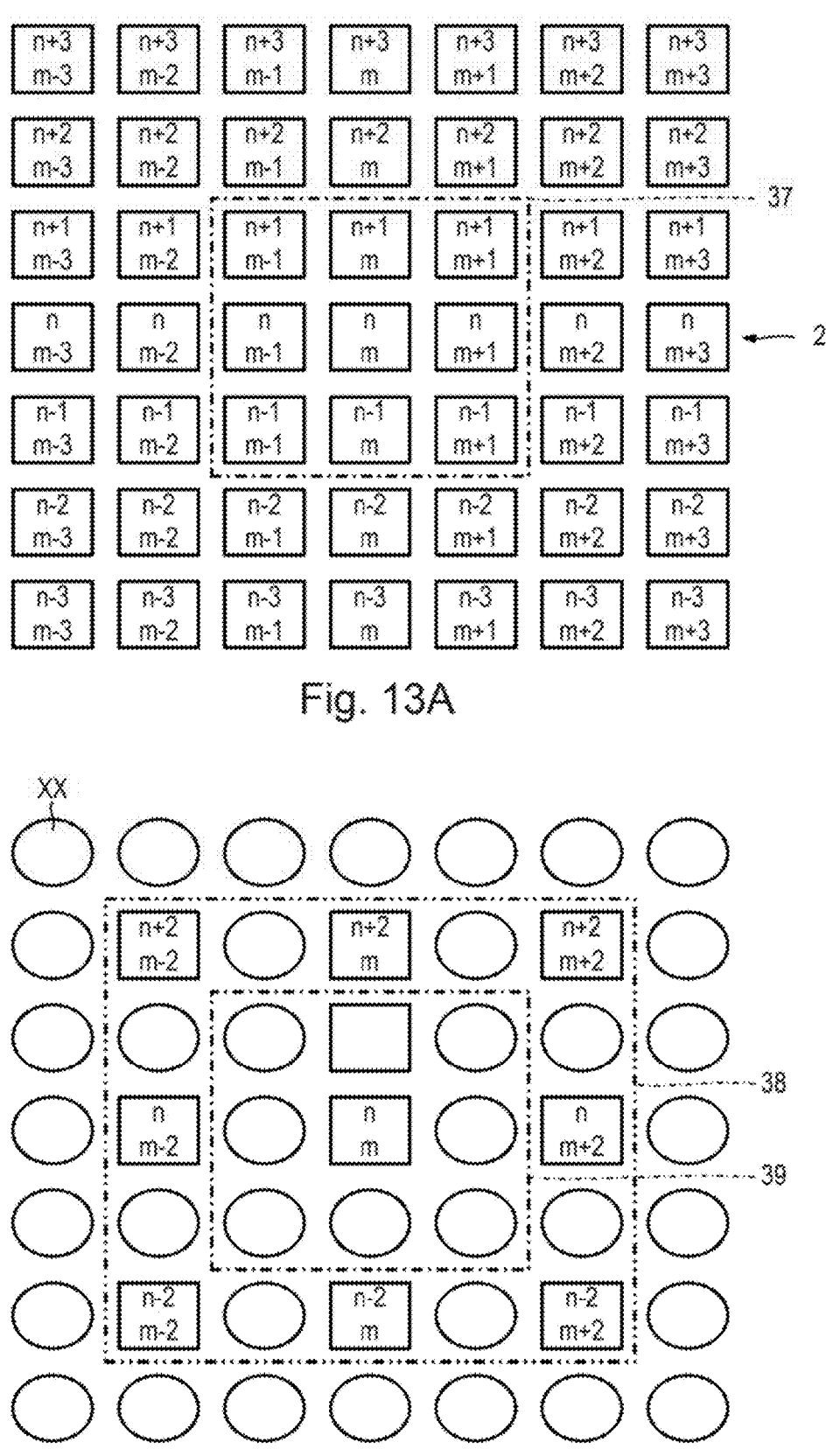

Referring to FIG. 13A, a spatial low-pass filter 36 may take the form of a linear filter mask 37 applied to the zero-inserted, or intermediate, frame values $F_{zero}(n,m,k)$ and centred on a pixel corresponding to a particular sensor area $I_{n,m}$. The linear filter mask 37 has dimensions L by W pixels, which are typically positive odd integers to ensure that a single sensor area $I_{n,m}$ is the centre of the linear filter mask 37. A linear filter mask 37 may be represented as an array or matrix of coefficients $C_{i,j}$, where $0 \leq i \leq L-1$ and $0 \leq j \leq W-1$ are integer suffixes. For example, for an average filter with dimensions L=3 by W=3 pixels, the coefficients may all have the value $C_{i,j}=\frac{1}{9}$, so that the linear filter mask 37 may be represented as:

$$C = \frac{1}{9}\begin{pmatrix} 1 & 1 & 1 \\ 1 & 1 & 1 \\ 1 & 1 & 1 \end{pmatrix}$$

When L and W are odd integers, the filtered frame values $F_{LPSF}(n,m,k)$ obtained by application of the linear filter mask 37 may be expressed as:

$$F_{LPSF}(n, m, k) = \sum_{i=0}^{L-1}\sum_{j=0}^{W-1} C_{i,j} \times F_{zero}\left(n + i - \frac{L-1}{2}, m + j - \frac{W-1}{2}, k\right)$$

For zero-inserted frame values $F_{zero}(n,m,k)$ at edges and corners, i.e. when n=1 or N and m=1 or M, different mask coefficients $C_{i,j}$ may be used to avoid attenuation of signals close to boundaries.

The optimal dimensions L, W and coefficients $C_{i,j}$ for a linear filter mask 37 for application to a given touchscreen panel 1 may depend upon the both the physical characteristics of the touchscreen panel 1 and the characteristics of the touch events such as a contact area of the user's digit 33 or of a suitable stylus. Linear filters as described in Equations 10 and 11, for example average or Gaussian filters, may be preferred in general applications due to the simplicity of implementation, low processing requirements and the capacity to balance performance between user digit 33 touches and stylus touches. A linear Gaussian filter may be represented by an array composed of coefficients $C_{i,j}$ expressed generally as:

$$C_{i,j} = G\exp\left(-\frac{\left(i - \frac{L-1}{2}\right)^2}{\sigma_n^2} - \frac{\left(j - \frac{W-1}{2}\right)^2}{\sigma_m^2}\right)$$

in which G is an amplitude, L and W are the dimensions of the linear filter mask 37, i and j are indices ranging from $0 \leq i \leq L-1$ and $0 \leq j \leq W-1$ respectively, $\sigma_n$ is a standard deviation in a first direction x and $\sigma_m$ is a standard deviation in a second direction y. The amplitude G is preferably a normalisation factor to minimise an overall increase or decrease in the average intensity of the filtered frame values $F_{LPSF}(n,m,k)$ compared to the zero-inserted frame values $F_{zero}(n,m,k)$. In general, a touchscreen panel 1 having an array 2 of sensor areas $I_{n,m}$ need not be a square grid, and the standard deviations $\sigma_n$, $\sigma_m$ may be different accordingly. When an array 2 is square, so that sensor areas $I_{n,m}$ are spaced evenly in first and second directions x, y, the standard deviations are also equal, i.e. $\sigma_n=\sigma_m=\sigma$. For example, when a linear filter mask 37 has dimensions $L=3$ by $W=3$ pixels, the coefficients may be expressed as:

$$C_{i,j} = G\exp\left(-\frac{(i-1)^2 + (j-1)^2}{\sigma^2}\right)$$

in which $0 \leq i \leq 2$ and $0 \leq j \leq 2$.

Non-linear filters involve, for example, derivation of a filtered value using statistics such as determining a median value. Non-linear filters may be preferred for some applications because non-linear filters may potentially provide superior attenuation of noise spikes. However, non-linear filters may excessively attenuate signals of touch events corresponding to low contact areas, for example a stylus touch.

Second method of processing output signals from a touchscreen panel: Referring to FIGS. 2, 7, 13A and 14, a second method of processing output signals from a touchscreen panel shall be explained. The frame acquisition module 6 acquires a down-sampled, or partial, frame $F_{down}$ in the same way as for the first method, except that in the second method the sensor areas $I_{n,m}$ sampled to acquire the down-sampled frame $F_{down}(n,m,k)$ are preferably selected according to a fixed pattern (step S1; step S9). For example, for the second to fourth capacitive touch panels 22, 23, 28 in which the sensor areas $I_{n,m}$ are defined by intersections of the drive and sense electrodes $D_n$, $S_m$, every other drive electrode, e.g $D_{n-2}$, $D_n$, $D_{n+2}$, and every other sense electrode $S_{m-2}$, $S_m$, $S_{m+2}$ may be addressed to sample the corresponding sensor areas $I_{n,m}$, i.e. $f_{elec}=\frac{1}{2}$ and $f_{samp}=\frac{1}{4}$. Other electrode fractions $f_{elec}$ may be used such as, for example, $f_{elec}=\frac{1}{3}$, $f_{elec}=\frac{1}{4}$ and so on, provided that the subsequently generated filtered frame values $F_{SLPF}(n,m,k)$ are of sufficient quality. A down-sampled frame $F_{down}$ acquired in this way will have a resolution of $f_{elec} \times N$ by $f_{elec} \times M$, which is lower than a full resolution frame $F_{full}$.

The signal reconstruction module 7 receives the down-sampled, or partial, frame values $F_{down}(n,m,k)$ and carries out zero-insertion to generate the zero-inserted, or intermediate, frame $F_{zero}(n,m,k)$ (step S10). The zero-inserted frame $F_{zero}(n,m,k)$ has a resolution of N by M which is equal to a full resolution frame $F_{full}(n,m,k)$. The values of zero are inserted corresponding to sensor areas $I_{n,m}$ which were not sampled when acquiring the down-sampled frame values $F_{down}(n,m,k)$.

The signal reconstruction module 7 retrieves a linear filter mask 37 representing a spatial low-pass filter 36 from the spatial low-pass filter mask store 14 and applies the linear filter mask 37 to the zero-inserted, or intermediate, frame values $F_{zero}(n,m,k)$ according to Equation (11) to generate the new, filtered frame $F_{LPSF}(n,m,k)$ (step S11). The linear filter mask 37 may correspond to, for example, an average filter as in Equation (10). The spatial low pass filter 36 recovers the spatial low frequency property of signals corresponding to touch events. In image processing, an analogous process may be referred to as "image blur". The size L, W of the linear filter mask generally depends on the sampling fraction $f_{samp}$.

Referring also to FIG. 13B, in one preferable example, sensor areas $I_{n,m}$ are provided by intersections of first and second electrodes $X_n$, $Y_m$, and the down-sampled frame values $F_{down}(n,m,k)$ are sampled by addressing every other first and second electrode $X_n$, $Y_m$, i.e. $f_{elec}=\frac{1}{2}$ and $f_{samp}=\frac{1}{4}$. For example, every other drive and sense electrode $D_n$, $S_m$ of the second to fourth capacitive touchscreen panels 22, 23, 28 might be addressed to sample the corresponding sensor areas $I_{n,m}$. In such an example, the spatial low-pass filter 36 may be represented by a linear filter mask 37 of size or dimension L=(2i+1) by W=(2i+1) in which i is a positive integer. For example, the linear filter mask 37 may be an average filter mask 38 of size L=5 by W=5 pixels and having coefficients $C_{i,j}=\frac{1}{25}$. A smaller average filter mask 39, for example of size L=3 by W=3 pixels, would only ever encompass one value sampled from a sensor area $I_{n,m}$ at a time and consequently would not smooth out any noise spikes relative to the underlying touch signal. Noise spikes are noise signals affecting essentially one sensor area $I_{n,m}$. By contrast, an average filter mask 38 of size L=5 by W=5 pixels encompasses between four and nine sampled sensor areas $I_{n,m}$ so that the amplitude of noise spikes may be reduced relative to an underlying touch signal. The reduction of noise spikes may contribute to improvements in detection accuracy. Reducing the amplitude of noise spikes may also reduce power consumption by allowing the signals used to drive sensor areas $I_{n,m}$, and/or amplify signals received from sensor areas $I_{n,m}$ to be reduced in amplitude.

Larger filters, for example having dimensions of L=9 by W=9 pixels, may be used. However, the size of the filter should relate to the actual size 1 and spacing s of sensor areas $I_{n,m}$ in relation to a typical contact area of a user's digit 33 or a suitable stylus. In particular, if the size of the linear filter mask 37 is made larger than the typical contact area of a user's digit 33 or a suitable stylus, application of the linear filter mask 37 may weaken the strength of the signal corresponding to a touch event. Alternatively, where smaller electrode fractions $f_{elec}$ may be used, for example $f_{elec}=\frac{1}{3}$ or $f_{elec}=\frac{1}{4}$, linear filter masks 37 may be made larger as appropriate. Electrode fractions below $f_{elec}=\frac{1}{2}$ may be inappropriate unless the first and second electrodes $X_n$, $Y_m$ are closely spaced compared to a typical size of the contact area of a user's digit or a suitable conductive stylus. The coefficients $C_{i,j}$ of the linear filter mask 37 need not represent a spatial low pass filter 36 which is an average filter. Alternatively, the coefficients $C_{i,j}$ of the linear filter mask 37 represent a Gaussian filter as Equations (12) or (13).

The touch decision module 8 receives the filtered frame values $F_{LPSF}(n,m,k)$ and determines the presence or absence of at least one touch event in the same way as for the first method (step S3; step S12).

One or more regional sub-frames $F_{reg}$ and/or one or more additional sub-frames $F_{add}$ may be acquired in the same way as for the first method (steps S4 to S6; steps S13 to S15). Regional sub-frame values $F_{reg}(n,m,k)$ are sampled in the second method because the blurring produced by the spatial low-pass filter 36 may cause the estimated locations of touch events to be displaced by an amount Δd, similar to the effects of the compressive sensing method applied in the first method. In the second method, the size of regions, or sub-arrays, 3 used for acquiring the regional sub-frame(s) depends on the quality of the resulting filtered frames $F_{LPSF}$.

Optionally, the shape recognition module 11 may receive the filtered frame values $F_{LPSF}(n,m,k)$, determine shape information about each registered touch event, and provide the shape information to the communications module 10 (step S16).

Acquiring regional sub-frames $F_{reg}$ by sampling regions 3 including the estimated touch locations enables the locations of the touch events to be determined with the same level of detection accuracy obtainable using a full resolution frame $F_{full}$. However, the total number of sensor area $I_{n,m}$ sampling operations for obtaining down-sampled frame values $F_{down}(n,m,k)$ and the regional sub-frame(s) values $F_{reg}(n,m,k)$ may be less or substantially less than the total number N×M of sensor area $I_{n,m}$ sampling operations for acquiring a full resolution frame $F_{full}(n,m,k)$. In this way, the energy consumption of a touchscreen system 4 may be reduced whilst maintaining the detection accuracy. When sensor areas $I_{n,m}$ are sampled sequentially, the second method of processing output signals from a touchscreen panel may also decrease the acquisition interval and improve responsivity.

When sensor areas $I_{n,m}$ are sampled sequentially, the second method of processing output signals from a touchscreen panel may improve the detection accuracy because regional sub-frame values $F_{reg}(n,m,k)$ may be averaged with one or more additional sub-frame values $F_{add}(n,m,k)$ to reduce the amplitude of uncorrelated noise signals. When sensor areas $I_{n,m}$ are sampled substantially simultaneously, for example if the sensor areas $I_{n,m}$ correspond to discrete sensors, the regional sub-frame values $F_{reg}(n,m,k)$ may still be averaged with one or more additional sub-frame values $F_{add}(n,m,k)$ to improve detection accuracy if the extra time for acquiring the additional sub-frame(s) $F_{add}$ does not decrease the responsivity below a threshold for user perceptibility.

Additionally in the second method of processing output signals, the smoothing effect of the spatial low pass filter 36 reduces the amplitude of noise spikes. This may increase detection accuracy, and may also allow the energy consumption of driving or sensing a sensor area $I_{n,m}$ to be reduced by increasing the signal-to-noise ratio (SNR) for the touchscreen system 4.

Experimental and simulation results applying the second method: Referring to FIGS. 2, 7, 14 and 20, in the same way as for the first method, the application of the second method of processing output signals may be assessed by performing Monte Carlo simulations which sample full resolution frame values $F_{full}(n,m,k)$ acquired using the 80 by 80 experimental capacitive test bed. The optional shape recognition was also assessed.

Figure 15A:
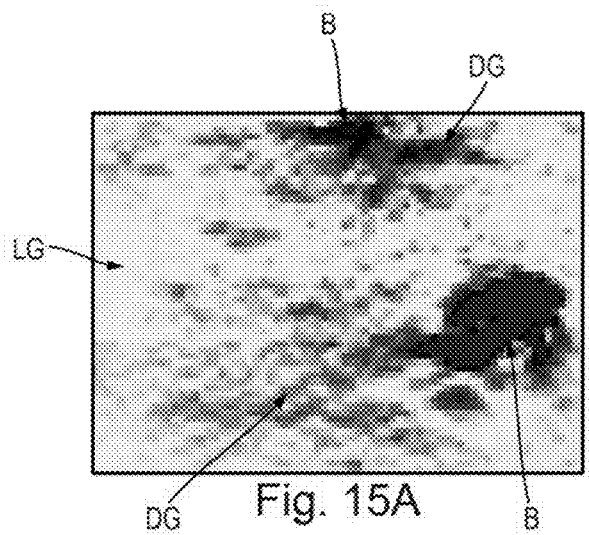
FIGS. 15A to 15F illustrate processing of output signals according to a second method of processing output signals from a touchscreen panel with selection of a fixed pattern of rows and columns of an array of touch panel sensor areas.
Figure 15B:
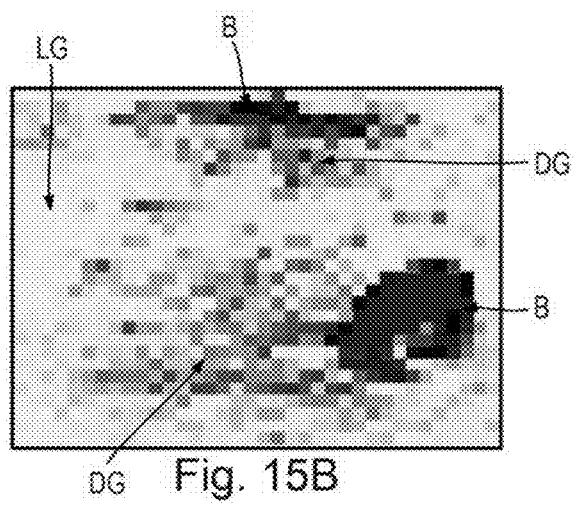
Figure 15C:
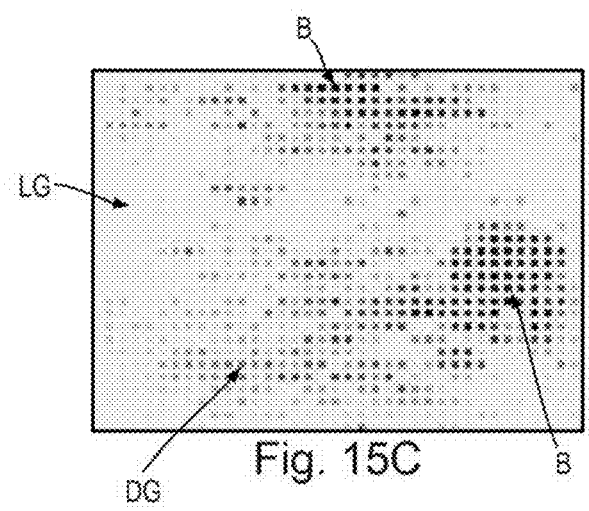
Figure 15D:
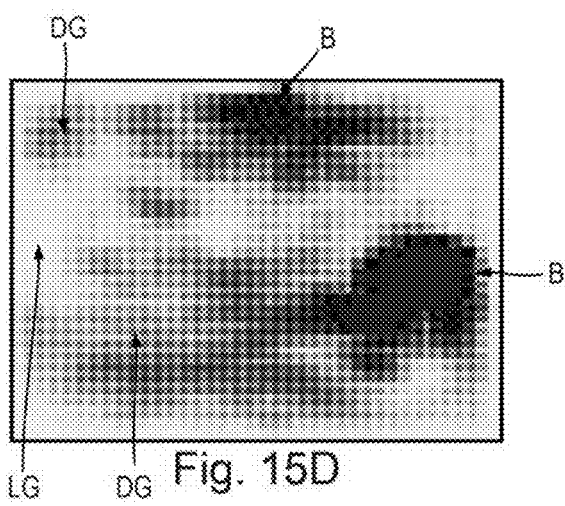
Figure 15E:
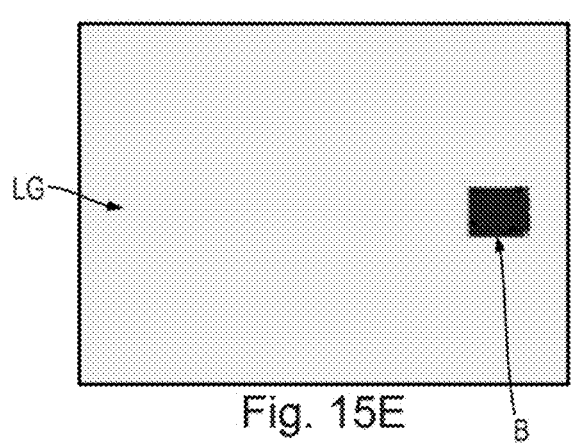
Figure 15F:
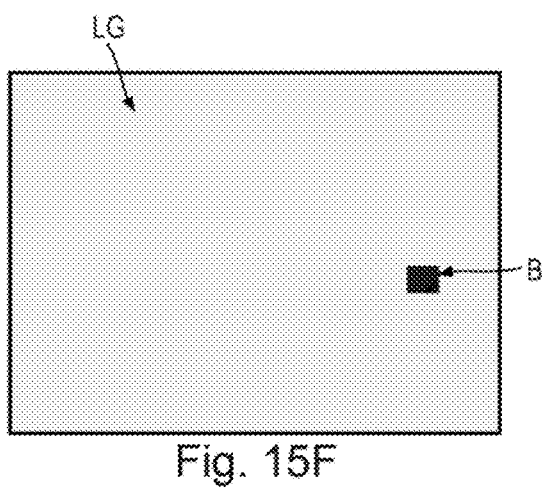

Referring also to FIG. 15A, a full resolution frame $F_{full}$ acquired for a swipe-touch event is shown. A swipe-touch event may be single or multi-touch swipe, and corresponds to the situation that a user's digit(s) and/or a suitable stylus are moving relatively rapidly across the touchscreen panel 1. In grayscale plots illustrating frames, regions labelled "LG" correspond to low signal levels, regions labelled "DG" correspond to intermediate signal levels and regions labelled "B" correspond to high signal level.

Referring also to FIGS. 15B to 15F, which show respectively a down-sampled frame $F_{down}$, a zero-inserted frame $F_{zero}$, a filtered frame $F_{LPSF}$, a regional sub-frame $F_{reg}$ and an additional sub-frame $F_{add}$, all corresponding to the same swipe-touch shown in FIG. 15A. The down-sampled frame $F_{down}$ shown was acquired using an electrode fraction of $f_{elec}=\frac{1}{2}$ by sampling every other drive and sense electrode $D_n$, $S_m$ of the experimental capacitive test bed.

Referring also to FIG. 22, the parameters of resolution, shape recognition, noise spike attenuation, detection accuracy, power consumption and acquisition rate are summarized with respect to a full resolution frame $F_{full}$ and the frames $F_{down}$, $F_{zero}$, $F_{LSPF}$, $F_{reg}$ acquired or produced during the second method.

In the down-sampled frame $F_{down}$, the resolution is relatively decreased, whilst the shape of a touch event is retained. The resolution of the zero-inserted frame $F_{zero}$ is recovered to the original 80 by 80 resolution of the experimental capacitive test bed. However, the zero-insertion compromises the low spatial frequency properties of touch event signals, imposing challenges on the optional shape recognition step. In the filtered frame $F_{LPSF}$, the blurring effect of the spatial low-pass filter 36 has recovered the spatial low frequency properties of the touch event signals.

The regional sub-frame $F_{reg}$ is acquired by sampling all the sensor areas within a region 3 and allows a more accurate touch location to be determined. After obtaining the more accurate touch location, additional sub-frame(s) $F_{add}$ may be acquired for other purposes such as, for example, to provide information for sub-pixel interpolation, for averaging to reduce the amplitude of noise spikes and so forth. After application of the spatial low-pass filter 36, the SNR between the touch signal and the peak noise spikes is increased by 4.74 dB. Although noise spikes are not inherently attenuated when sampling regional sub-frame values $F_{reg}(n,m,k)$, they may be attenuated by averaging regional sub-frame values $F_{reg}(n,m,k)$ with one or more additional sub-frame values $F_{add}(n,m,k)$. Alternatively, the frame acquisition module 6 may acquire a regional/additional sub-frame $F_{reg}$, $F_{add}$ and pass it to the sub-frame acquisition module 9 via the signal reconstruction module 7 to allow the spatial low-pass filter 36 to be applied also to the regional sub-frame values $F_{reg}(n,m,k)$ and/or the additional sub-frame values $F_{add}(n,m,k)$. The purpose of the regional sub-frame $F_{reg}$ is to obtain an accurate touch position, and this frame is not used for the optional shape recognition functions.

Similar to case with the first method, in the second method the size of a region 3 used for acquiring regional sub-frame values $F_{reg}(n,m,k)$ and/or the additional sub-frame values $F_{add}(n,m,k)$ depends on the quality of the reconstructed touch signal in the filtered frame $F_{LPSF}$. The quality of the reconstructed touch signal is related to the touch signal properties (shape and position etc), the sampling fraction $f_{samp}$, the size and type of the spatial low-pass filter 36 and the amplitude of noise signals and offset values. In examples of the simulations based on sampling of full resolution frame values $F_{full}(n,m,k)$ acquired using the experimental capacitive test bed, the spatial low pass filter 36 was represented by a linear filter mask 36 in the form of a 5 by 5 pixel average filter mask 38.

Figure 16:
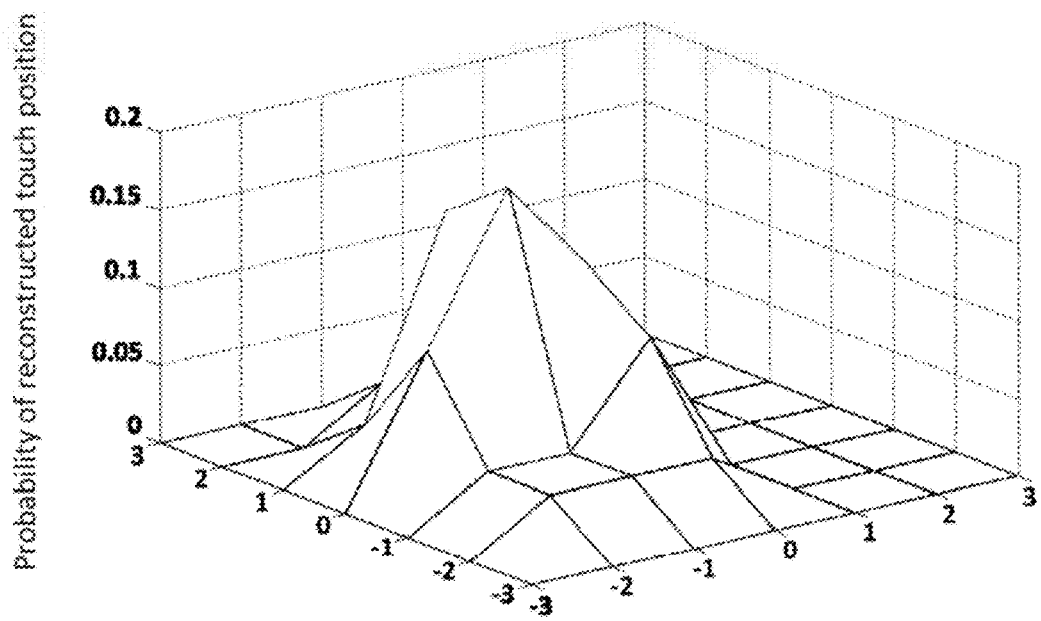
FIG. 16 shows a simulated distribution of displacements between estimated and original locations of touch events for a second method of processing output signals from a touchscreen panel.

Referring also to FIG. 16, a distribution of the displacements $\Delta d$ of estimated touch locations determined from filtered frames $F_{LPSF}$. The displacements $\Delta d$ were determined based on reconstruction of down-sampled frames $F_{down}$ generated using full resolution frames $F_{full}$ acquired experimentally using the experimental capacitive test bed, in the same way as for the simulations using the first method.

Figure 17:
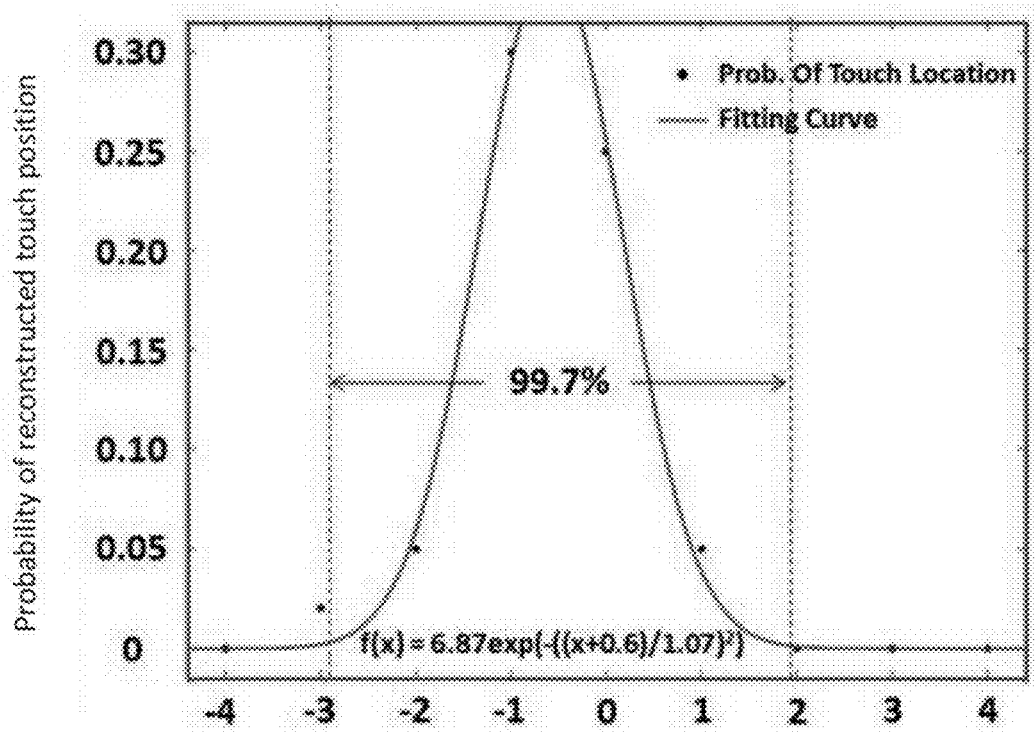
FIG. 17 shows a Gaussian distribution fitted to a simulated distribution shown in FIG. 16.
Figure 18:
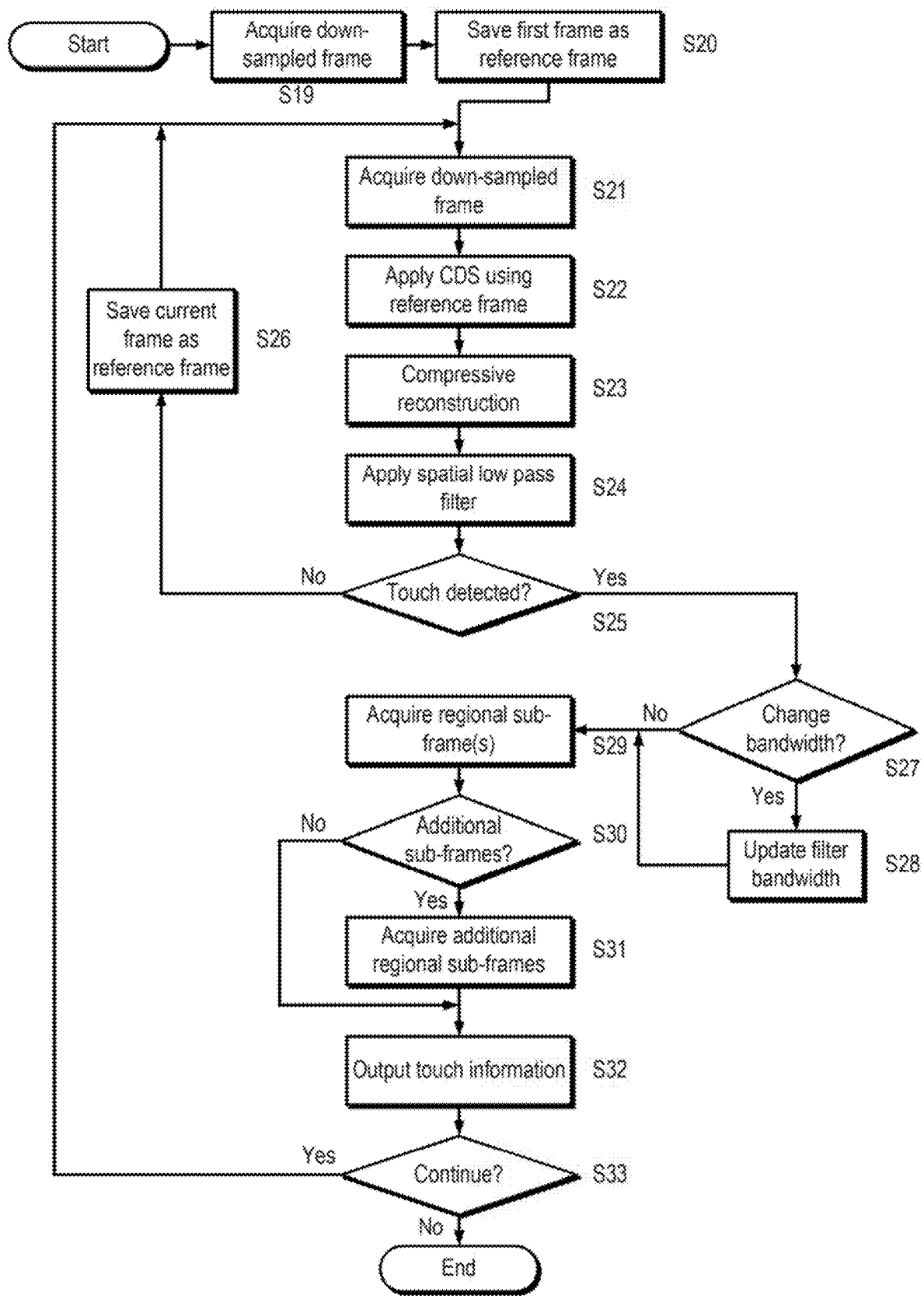
FIG. 18 is a process flow diagram of a first method of processing output signals from a touchscreen panel modified to include correlated double sampling methods and spatial low-pass filtering.
Figure 19:
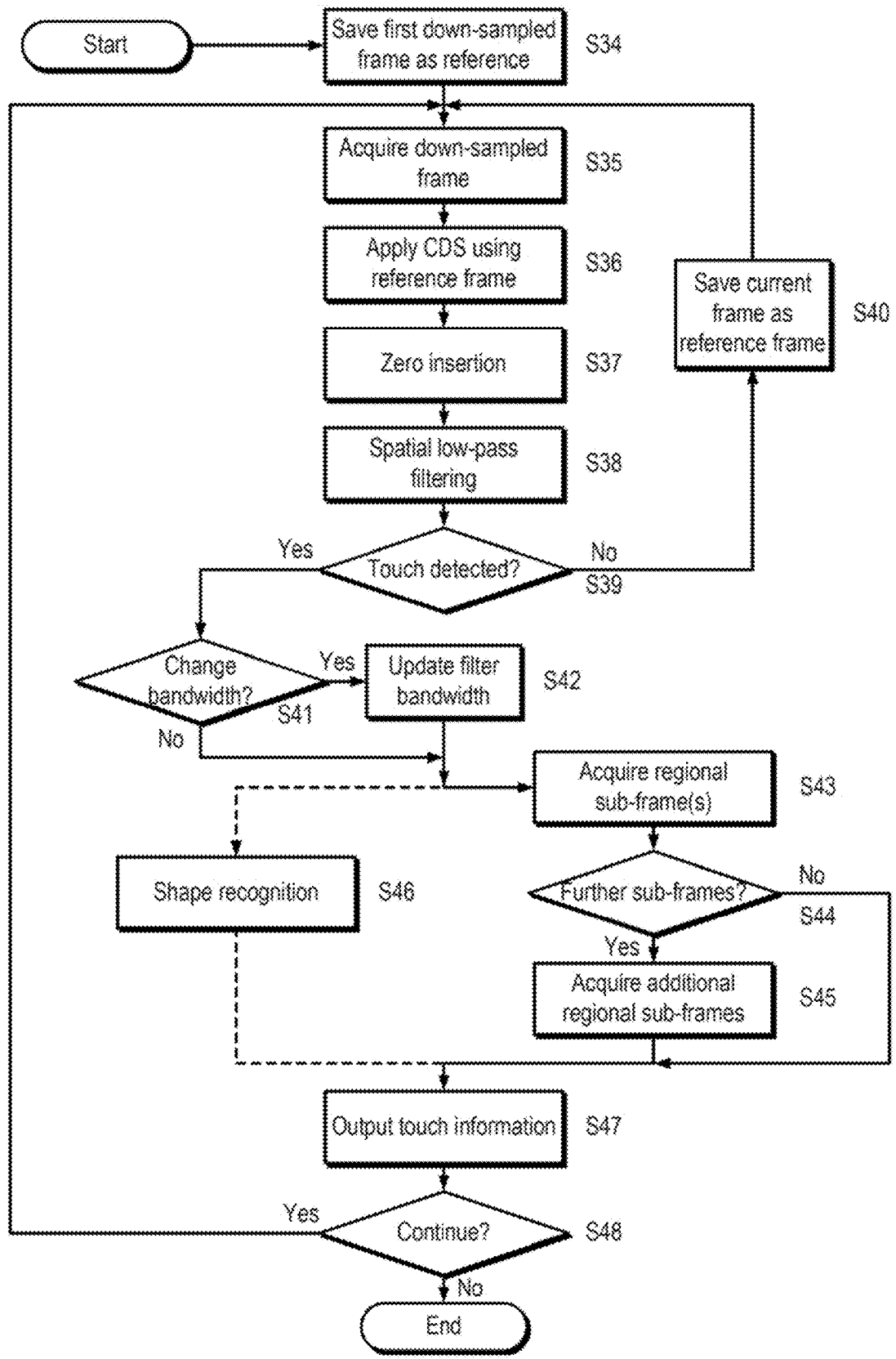
FIG. 19 is a process flow diagram of a second method of processing output signals from a touchscreen panel modified to include correlated double sampling methods.

Referring also to FIG. 17, taking the largest cross-section of the distribution of displacements $\Delta d$, parameters of a Gaussian distribution may be fitted as:

$$f(\Delta d) = 6.87 \exp\left(-\left(\frac{\Delta d + 0.6}{1.07}\right)^2\right)$$

in which $\Delta d$ is the displacement between an estimated touch location determined using a filtered frame $F_{LPSF}$ and the location determined in a corresponding full resolution frame $F_{full}$. If the probability bound of 99.7% is taken as the maximum, then the maximum displacement $\Delta d$ is approximately 2 pixels. In the same way as for the first method, to ensure that the regional sub-frame(s) cover the actual touch location, the size of a region 3 used for acquiring regional sub-frames should be twice the maximum displacement $\Delta d$, for example as Equation (7) when the region 3 is square.

Using the parameters applied to the simulations using the experimental capacitive test bed, namely $f_{elec}=0.5$, $f_{samp}=0.25$, L=5 by W=5 pixel average mask 38, the region 3 according to Equation (7) is of 7 by 7 pixels, corresponding to sampling 49 sensor areas $I_{n,m}$ for each touch event when acquiring the regional sub-frame(s) $F_{reg}$. In the case of these example values of parameters and the example of the experimental capacitive test bed, the acquisition of an accurate single touch position uses $N_{total}=1649$ sampling operations of sensor areas $I_{n,m}$, compared to 6400 for acquiring a full resolution frame $F_{full}$ from the projected capacitance test bed. For multi-touch events, the total number $N_{total}$ of sensor area $I_{n,m}$, sampling operations may be estimated according to Equation (8).

Example of the time and energy budget for the second method: Referring to FIGS. 2, 14, 20 and 22, the time and energy budget for the second method of processing output signals from a touchscreen panel is described with reference to the example of the experimental capacitive test bed. Values are specific to the experimental capacitive test bed and will need to be calculated separately using appropriate parameters for other examples of different touchscreen panels.

The algorithm computation complexity for the second method is $O(2N_{total})$, which indicates that approximately 12,800 multiplications are needed to reconstruct the signal. For a GHz range processor, the calculation time is about 12.8 µs. Compared to the time of a touch event, for example of the order of 0.1 seconds, and the acquisition interval $\Delta T_{acq}$, for example approximately 17 ms, the calculation time can be neglected. Commercially available embedded processors may achieve power efficiency over 20 MIPS/mW, which means that the power consumption may be of the order of 4 µW. By way of comparison, the energy cost SE for sampling one sensor area $I_{n,m}$ is approximately ⅓ µJ. For the experimental test bed, the power consumption is around 12.8 mW for an acquisition frequency of 60 Hz. Therefore the power consumption of the compressive sensing reconstruction is relatively insignificant. If the acquisition frequency $f_s$ is maintained at 60 Hz and $f_{samp}=¼$ of sensor areas are sampled ($f_{elec}=½$ sampling every other drive and sense electrode $D_n$, $S_m$), then around 8.79 mW can be saved for the example of the experimental test bed.

Similarly to the first method, when the sensor areas $I_{n,m}$ of the touchscreen panel 1 are sampled sequentially, the second method may allow multiple regional sub-frame values $F_{reg}(n,m,k)$ to be sampled whilst maintaining or increasing the responsivity compared to acquiring full resolution frame values $F_{full}(n,m,k)$. Averaging the regional sub-frame values $F_{reg}(n,m,k)$ with one or more additional sub-frame values $F_{add}(n,m,k)$ reduces the amplitude of uncorrelated noise signals which may improving detection accuracy. For the example of the described experimental test bed, with N=M=80 and an acquisition frequency $f_s$ of 60 Hz, the acquisition interval $\Delta T_{acq}$ is approximately 16.7 ms, and the time interval for sampling a sensor area $I_{n,m}$ is approximately $\delta t=2.6$ µs. If a sampling fraction of $f_{samp}=50\%$ is used, then acquiring the down-sampled frame $F_{down}(n,m,k)$ and processing it to generate the filtered frame $F_{LPSF}(n,m,k)$ takes roughly 8.4 ms. If one touch event occurs, then the corresponding time for acquiring the regional sub-frame $F_{reg}$ is approximately 0.2 ms. Up to 40 additional sub-frames $F_{add}$ could be acquired within the 16.7 ms acquisition interval for acquiring a full resolution frame $F_{full}$. When multi-touch events occur, fewer additional regional sub-frames may be acquired within the original acquisition interval $\Delta T_{acq}$. The relationship between the time interval for acquiring a full resolution frame $F_{full}$ and the time interval for the second method may be expressed as:

$$\Delta T_{full} \geq \Delta T_{down} + N_{touch} N_{reg} \delta t$$

which is the same as the relationship expressed in Equation (9) for the first method.

First method modified using dynamic correlated double sampling and spatial filtering: Referring to FIGS. 2, 7, 14 and 18, the first method may be modified to incorporate correlated double sampling methods and spatial low-pass filtering. The modified first method has increased signal-to-noise ratio due to reduction of the influence of sensor area $I_{n,m}$ offset values and attenuation of noise spikes, providing increased detection accuracy. With increases signal-to-noise ratio, a detection threshold for the touch decision module 8 can be reduced, which may allow a reduction in the excitation voltage for driving a sensor area $I_{n,m}$ and/or for amplifying signals from a sensor area $I_{n,m}$. In this way, the modified first method may further decrease the energy consumption for obtaining touch information from a touchscreen panel 1.

The frame acquisition module 6 acquires a first down-sampled, or partial, frame $F_{down}(n,m,1)$ in the same way as for the first method (step S19; step S1). The first down-sampled frame $F_{down}(n,m,1)$ is acquired by sampling a fraction $f_{samp}$ of the sensor areas $I_{n,m}$ or a fraction $f_{elec}$ of the first and second electrodes $X_n$, $Y_m$ defining the sensor areas $I_{n,m}$. In either case, the sensor areas $I_{n,m}$ to be sampled are preferably selected at random. The frame acquisition module 6 stores the locations of the sensor areas $I_{n,m}$ sampled to obtain the first down-sampled frame $F_{down}(n,m,1)$. The first down-sampled frame $F_{down}(n,m,1)$ may be acquired whenever a device incorporating the touchscreen system 4 is powered up, wakes from a sleep or low power mode, or in response to an instruction for the frame acquisition module 6 to vary the sampled fraction $f_{samp}$ or the electrode fraction $f_{elec}$ in response to, for example, poor quality of the reconstructed frame $F_{recon}$.

The frame acquisition module 6 stores the first down-sampled frame values $F_{down}(n,m,1)$ to the reference frame store 13 as a reference frame $F_0(n,m)$ (step S20). The first down-sampled frame $F_{down}(n,m,1)$ is assumed to contain no signals corresponding to touch events. Thus, the first down-sampled $F_{down}(n,m,1)$ represents a measurement of the offset values of the touch sensors $I_{n,m}$.

The frame acquisition module 6 acquires the subsequent down-sampled, or partial, frame values $F_{down}(n,m,k)$ in the same way as for the first method, except that each subsequent down-sampled frame $F_{down}(n,m,k)$ is acquired by sampling the same sensor areas $I_{n,m}$ as the first down-sampled frame $F_{down}(n,m,1)$ (step S21; step S1). The sensor areas $I_{n,m}$ sampled to acquire the first down-sampled frame $F_{down}(n,m,1)$ are stored in the frame acquisition module 6.

The correlated double sampler 12 receives the down-sampled frame values $F_{down}(n,m,k)$ from the frame acquisition module 6 and receives the reference frame value $F_0(n,m)$ from the reference frame store 13, and calculates a corrected frame $F_{CDS}(n,m,k)$ using correlated double sampling (step S22) according to:

$$F_{CDS}(n,m,k) = F_{down}(n,m,k) - F_0(n,m)$$

in which $F_{CDS}(n,m,k)$ are corrected signal frame values and $F_{down}(n,m,k)$ are the values corresponding to the sampled sensor areas $I_{n,m}$. The index k is a positive integer used to distinguish between, for example, the presently acquired down-sampled frame values $F_{down}(n,m,k)$ and subsequently acquired down-sampled frame values $F_{down}(n,m,k+1)$, and there is no upper bound for k. The corrected frame $F_{CDS}(n,m,k)$ may be represented, for each value of k, as a array or matrix in which the integer values n, m denote the row and column of an entry. In this way, the correlated double sampler 12 removes or reduces offsets in signals sampled from the sensor areas $I_{n,m}$, which may reduce the possibility of the touch decision module 8 mis-registering a touch event and/or enable the use of a lower detection threshold in the touch decision module 8. As explained hereinbefore, reducing the detection threshold in the touch decision module 8 may contribute to further reductions in energy consumption.

The signal reconstruction module 7 receives the corrected frame values $F_{CDS}(n,m,k)$ and applies a compressive sensing method to generate new, reconstructed frame values $F_{recon}(n,m,k)$ in the same way as the first method (step S23; step S2). The offset values of sensor areas $I_{n,m}$ are typically uncorrelated both to the offsets of adjacent sensor areas, e.g. $I_{n,m+1}$, and to touch signal values. Therefore, the down-sampled frame $F_{down}$ includes a superposition of the touch signal with the uncorrelated offsets, which can reduce the quality of reconstructions using compressive algorithms. Consequently, by first reducing or removing the offsets to generate the corrected frame values $F_{CDS}(n,m,k)$, the quality of the reconstructed frame values $F_{recon}(n,m,k)$ may be improved for a given sampling fraction $f_{samp}$. In this way, detection accuracy of the modified first method may be further improved.

The signal reconstruction module 7 applies a spatial low-pass filter 36 to the reconstructed frame values $F_{recon}(n,m,k)$ to produce filtered frame values $F_{LPSF}(n,m,k)$ in the same way as for the second method (step S24; step 11). The spatial low pass filter 36 may take the form of a linear filter such as an average or Gaussian filter. The signal reconstruction module 7 may filter the reconstructed frame values $F_{recon}(n,m,k)$ using a linear filter mask 37 received from the mask store 14 in the form of an matrix or array of coefficients $C_{i,j}$ having dimensions L by W, according to:

$$F_{LPSF}(n,m,k) = \sum_{i=0}^{L-1} \sum_{j=0}^{W-1} C_{i,j} \times F_{recon}\left(n+1-\frac{L-1}{2}, m+j-\frac{W-1}{2}, k\right)$$

which is similar to Equation (11). For frame values at edges and corners, i.e. $F_{recon}(n,m,k)$ when n=1 or N and m=1 or M, different mask coefficients $C_{i,j}$ may be used. Because touch signals have naturally low spatial frequency, the spatial low-pass filter 36 may preferentially attenuate noise spikes relative to the underlying touch signal. If the compressive sensing method produces any high spatial frequency artefacts then these will also be attenuated relative to the desired touch signals. Although the spatial low pass filter 36 has been described as a linear filter, the spatial low pass filter 36 may be a non-linear filter such as, for example, a median filter.

The touch decision module 8 determines the presence or absence of one or more touch events in the same way as the first method (step S25; step S3). Unlike the first method, if no touch events are registered, a new reference frame F0 is calculated based on exponential smoothing of the current down-sampled frame values $F_{down}(n,m,k)$ and the existing reference frame values F0(n,m) according to:

$$F_0(n,m) \to \delta \times F_0(n,m) + (1-\delta) F_{down}(n,m,k)$$

in which $\delta$ is a weighting factor. The weighting factor $\delta$ can be adjusted to optimize performance. In one example, the weighting factor $\delta$ may be equal to zero so that the new reference frame $F_0$ is equal to current down-sampled frame $F_{down}$. The new reference frame F0 is stored to the reference frame store 13 to replace the reference frame $F_0(n,m)$ (step S26) before the subsequent down-sampled frame values $F_{down}(n,m,k+1)$ are sampled. The use of exponential smoothing may increase the robustness of the adaptive correlated doubling sampling by reducing the possibility for an isolated "bad frame", for example a frame which corresponds to a touch event which is not registered by the touch decision module 8, to propagate the error into subsequent frames.

In this way, the stored reference frame $F_0$ is dynamically updated to reflect the most recently acquired frame in which no touch event is registered. Offset values are generally slowly varying, but may drift over time or change when the touchscreen system 4 is move to a different ambient environment. Dynamic alteration of the reference frame $F_0$ enables the touchscreen system 4 to adjust to changes in the offsets experienced by the touchscreen panel 1 over time or when moving between different ambient environments.

The bandwidth decision module 15 receives the filtered frame $F_{LPSF}(n,m,k)$ and estimated touch locations from the touch decision module 8, and determines whether the spatial bandwidth of the spatial low pass filter 36 requires adjustment (step S27). If the bandwidth of the spatial low-pass filter 36 should be adjusted, then the bandwidth decision module 15 replaces the mask coefficients $C_{i,j}$ of a linear filter mask 37 stored in the spatial low-pass filter store 14 with updated mask coefficients $C_{i,j}$.

The bandwidth decision module 15 uses the estimated locations of touch events determined by the touch decision module 8 to differentiate between touch signals and noise signals in the reconstructed frame $F_{recon}$ and filtered frame $F_{LPSF}$. For example, frame values $F_{recon}(n,m,k)$, $F_{LPSF}(n,m,k)$ corresponding to sensors areas $I_{n,m}$ determined to be part of a touch event by the touch decision module 8 are signal values, and any other non-zero values correspond to noise, residual offset values or artefacts resulting from the compressive sensing method. The bandwidth decision module 15 determines the attenuation of the touch signals and the attenuation of the residual noise signals, and determines whether the bandwidth of the spatial low pass filter 36 should be updated by changing the size and/or the coefficients $C_{i,j}$ stored in the mask store 14. For example, the bandwidth decision module 15 may tune the bandwidth of the spatial low pass filter 36 to maximise the attenuation of the noise signals whilst keeping the attenuation of the touch signals below a threshold amount. For example, the bandwidth of an average filter may be altered by varying the filter size, or the bandwidth of a Gaussian filter may be altered by varying the filter size and/or the standard deviation.

Subsequently, the regional sub-frame(s) values $F_{reg}(n,m,k)$ and optionally additional sub-frame(s) values $F_{add}(n,m,k)$ are acquired and touch information is determined and passed to the device CPU 17 via the communications module 10 in the same way as the first method (steps S29 to S32; steps S4 to S7). Whilst the touchscreen system continues to operate (step S33; Yes), the frame acquisition module 6 sampled the next down-sampled frame values $F_{down}(n,m,k+1)$ (step S21).

If noise signals or offset values lead to one or more touch events failing to be registered by the touch decision module 8, then no estimated location(s) will be calculated and no corresponding region(s) 3 will be sampled to obtain a regional sub-frame $F_{reg}$. In this way, even though correlated double sampling and spatial low-pass filtering processes are not applied to the regional sub-frame(s) values $F_{reg}(n,m,k)$ or additional sub-frame(s) values $F_{add}(n,m,k)$, the detection accuracy of the modified first method may be further improved.

Alternatively, instead of providing the regional/additional sub-frame(s) $F_{reg}$, $F_{add}$ to the sub-frame acquisition module 9 directly, the frame acquisition module 6 may provide the regional/additional sub-frame(s) $F_{reg}$, $F_{add}$ via the signal reconstruction module 7 to allow application of the spatial low-pass filter 36 to the regional/additional sub-frame values $F_{reg}(n,m,k)$, $F_{add}(n,m,k)$. When the spatial low-pass filter 36 is applied to the regional/additional sub-frames $F_{reg}$, it may be necessary to increase the size of the sampled region 3 or to use a linear filter mask 37 having difference coefficients $C_{i,j}$ to prevent the blurring effect from altering the determined touch location. Optionally, correlated double sampling may also be applied to the regional/additional sub-frame(s) prior to application of the spatial low-pass filter 36. For example, a full resolution frame $F_{full}$ could be acquired upon start-up and saved as the reference frame $F_0$. Such a full resolution reference frame $F_0$ may be refreshed periodically, for example during periods when no-touch events have occurred for an extended period. When a down-sampled frame $F_{down}$, a regional sub-frame $F_{reg}$ or an additional sub-frame $F_{add}$ is sampled, correlated double sampling may be applied by reading out and subtracting the pixel values of the full resolution reference frame $F_0$ corresponding to the sampled sensor areas $I_{n,m}$. For example, if a region 3 is defined as $n_0 \pm 2$, $m_0 \pm 2$, then the corresponding pixel values of the most recently obtained full resolution frame, i.e. $F_0(n_0 \pm 2, m_0 \pm 2)$, could be subtracted from the sampled values of the a regional sub-frame $F_{reg}(n,m,k)$. The full resolution reference frame may be partially updated in between periodic refreshing by acquisition of full resolution frames $F_{full}$. For example, when no touch events are registered (step S25; No), the values of the most recently acquired down-sampled frame $F_{down}(n,m,k)$ may be used to overwrite the corresponding values of a full resolution reference frame $F_0$. In this case, if the sensor areas $I_{n,m}$ sampled to acquire the down-sampled frame $F_{down}$ are randomly selected on acquiring each frame, or at regular intervals, a full resolution reference frame $F_0$ may be progressively updated even during extended periods of touch event activity.

Is use, the touch controller 5 may restart the modified first method (step S19) each time the touchscreen system is powered up, wakes from a sleep or low power mode or according to a predetermined schedule and conditional upon no touch events being in progress. This allows a new set of sensor areas $I_{n,m}$ to be randomly selected as the sampling points for acquiring down-sampled frames $F_{down}$. The modified first method may also be re-started (step S19) during the next available period with no touch events in response to the frame acquisition module 6 receiving an instruction to increase or decrease the sampling fraction $f_{samp}$.

Instead of randomly selecting the sensor areas $I_{n,m}$ to be sampled for acquiring down-sampled frames $F_{down}(n,m,k)$, the sampled sensor areas $I_{n,m}$ may be selected according to a fixed pattern. In such an example, the frame acquisition module 6 does not need to store the identities of the sampled sensor areas $I_{n,m}$.

Second method modified using dynamic correlated double sampling: Referring to FIGS. 2, 7, 14, 18 and 19, the second method may also be modified to incorporate correlated double sampling. The modified second method has increased signal-to-noise ratio due to reduction of the influence of sensor area $I_{n,m}$ offset values, which may increase detection accuracy. With increased signal-to-noise ratio, a detection threshold for the touch decision module 8 can be reduced, which may allow a reduction in the excitation voltage for driving a sensor area $I_{n,m}$ and/or for amplifying signals from a sensor area $I_{n,m}$. In this way, the modified second method may further decrease the energy consumption for obtaining touch information from a touchscreen panel 1.

The frame acquisition module 6 acquires a first down-sampled, or partial, frame $F_{down}(n,m,1)$ in the same way as for the second method (step S34; step S9). The first down-sampled frame $F_{down}(n,m,1)$ is stored as a reference frame $F_0(n,m)$ in the reference frame store 13 in a similar way as for the modified first method (step 34; step 20). In the modified second method, the sensor areas $I_{n,m}$ sampled to acquire the down-sampled frames $F_{down}$ are preferably selected according to a fixed pattern, for example, when sensor areas $I_{n,m}$ are defined by the intersections of first and second electrodes $X_n$, $Y_m$, by addressing every other first and second electrode $X_n$, $Y_m$ to sample $f_{samp}=25\%$ of the sensor areas $I_{n,m}$.

The subsequent down-sampled frame $F_{down}(n,m,k)$ is acquired in the same way as for the second method (step S35; step S9). The correlated double sampler 12 receives the down-sampled frame $F_{down}(n,m,k)$ and performs correlated double sampling to produce a corrected frame $F_{CDS}(n,m,k)$ in the same way as for the modified first method (step S36; step S22).

The signal reconstruction module 7 receives the corrected frame $F_{CDS}$, performs zero-insertion and applies the spatial low-pass filter 36 to produce the filtered frame $F_{LPSF}$ in the same way as for the second method, except that the input to the zero-insertion procedure is the corrected frame $F_{CDS}$ instead of the down-sampled frame $F_{down}$ (steps S37 and S38; steps S10 and S11).

The touch decision module 8 determines the presence or absence of one or more touch events based on the filtered frame $F_{LPSF}$ in the same way as for the second method (step S39; step S12). If no touch events are detected then the current down-sampled frame $F_{down}(n,m,k)$ is used to update or replace the reference frame $F_0(n,m)$ in a similar way to the modified first method (step S40; step 26).

The bandwidth decision module 15 determines whether the bandwidth of the spatial low pass filter 36 should be modified (step S41; step S27) and, if required, updates the mask coefficients $C_{i,j}$ stored in the spatial low pass filter store 14 (step S42; step S28) in same way as for the modified first method, except that the bandwidth of the spatial low pass filter 36 should be large enough to provide a sufficient blurring effect.

Acquisition of the regional sub-frame(s) $F_{reg}$, the optional additional sub-frame(s) $F_{add}$ and the determination of touch information to be provided to the device CPU 17 via the communication module 10 proceeds in the same way as for the second method (steps 43 to 47; steps 13 to 18). Whilst the second modified method continues (step S48; Yes), the subsequent down-sampled frame $F_{down}$ is acquired (step S35).

Modifications: It will be appreciated that many modifications may be made to the embodiments hereinbefore described. Such modifications may involve equivalent and other features which are already known in the design, manufacture and use of touch panels and which may be used instead of or in addition to features already described herein. Features of one embodiment may be replaced or supplemented by features of another embodiment.

Although experimental results and simulations have been presented to illustrate the first and second methods (FIGS. 8 to 11 and FIGS. 15 to 17), it should be appreciated that the results discussed are specific to the projected capacitive test bed (FIG. 20). These experimental results were obtained using a stylus which provided a contact area larger than a typical contact area for a touch event corresponding to a user's digit 33 (FIG. 5). However, the same or similar analysis methods may be applied in order to obtain equivalent information for other suitable touchscreen panels 1, whether such touchscreen panels 1 measure capacitance, resistance, pressure, a combination thereof or any other suitable parameters responsive to a touch event. Equally, the same or similar analysis methods may be applied in order to obtain equivalent information when touch events are produced corresponding to a user's digit 33 or any suitable stylus, for example, to calibrate the maximum expected displacements Δd in order to determine appropriate sizes for regions 3.

The frame acquisition module 6 may be instructed to change the sampling fraction $f_{samp}$ in use in response to a command from, for example, the sub-frame acquisition module 9 or the device CPU 17, depending upon which is determining the touch locations from the regional and/or additional sub-frames $F_{reg}$, $F_{add}$. The magnitude of noise signals may affect the quality of a reconstruction and the size of displacements Δd between estimated touch locations and more accurately touch event locations determined based on the regional and/or additional sub-frames $F_{reg}$, $F_{add}$. If the sub-frame acquisition module 9 or device CPU 17 determines that the quality of the reconstructed frames $F_{recon}(n,m,k)$ is too low, for example because the displacements Δd between estimated and confirmed touch event locations is excessive, then the sub-frame acquisition module 9 or device CPU 17 may instruct the frame acquisition module 6 to increase the sampling fraction $f_{samp}$. Equally, if the sub-frame acquisition module 9 or device CPU 17 determines that the displacements Δd between estimated and confirmed touch event locations are substantially smaller than one or two pixels, i.e. comparable to the typical separation s between sensor areas $I_{n,m}$, then the sub-frame acquisition module 9 or device CPU 17 may instruct the frame acquisition module 6 to decrease the sampling fraction $f_{samp}$ to further save energy and potentially further increase responsivity. In this way, the methods of processing output signals from a touchscreen panel may dynamically adapt to variations in the noise signals over time or when moving between different areas.

Transparent touchscreen panels 1 of a touchscreen system 4 have been described. However, the first and second methods and modifications thereof are not limited to transparent touchscreen panels 1 overlying or integrated into a display screen. For example, the first and second methods may also be applied to a touch panel, for example an opaque touch panel for providing input to a data processing device such as a laptop computer.

Methods of processing signals have been described in which the bandwidth of a spatial low pass filter 36 is adjusted by a bandwidth decision module 15. However, the bandwidth need not be variable, and in some alternative methods the bandwidth may be fixed at a single value or varied as a function of sampling fraction $f_{samp}$ according to a pre-calibrated relationship.

The efficiency of applying a linear filter mask 37 to frame values, e.g. $F_{zero}(n,m,k)$, $F_{CDS}(n,m,k)$ may be improved by not performing the summation in Equation 17 directly. For example, for an average filter, an intermediate frame may be constructed in which each pixel contains the sum of 3 pixels in the first direction x, for example $F_{zero}(n,m,k)+F_{zero}(n+1,m,k)+F_{zero}(n+2,m,k)$. The final filtered frame values $F_{LPSF}(n,m,k)$ may be obtained by performing the same process on the intermediate image in the second direction y and dividing by a scaling constant. This process is equally valid for Gaussian-weighted filters. This may be especially useful for touchscreen panels 1 having larger or denser arrays 2, which may require linear filter masks 37 with larger dimensions, because using an intermediate frame the computational complexity scales linearly with the linear filter mask 37 dimensions L, W, rather than quadratically.

Gaussian spatial low pass filters have been described. Alternatively, any spatial low pass filters having a peak and a parameter for adjusting the relative width of the peak may be used instead of a Gaussian filter.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. A method of processing output signals from a touch panel having a full resolution, the method comprising:
   obtaining a partial frame having a resolution less than a full resolution of the touch panel;
   reconstructing, based on the partial frame, a new frame having the full resolution;
   and for each of one or more touch events detected in the new frame;
   determining a first location based on the new frame;
   determining a second location based on a sub-frame obtained at and around the first location; and,
   outputting one or more second locations.

2. The method according to claim 1, wherein the touch panel comprises an array of sensor areas and the partial frame is obtained by sampling a sampling fraction of the sensor areas selected at random.

3. The method according to claim 2, wherein rows and columns of the array are selected at random based on the sampling fraction and wherein the sampled sensor areas correspond to intersections of the selected rows and columns.

4. The method according to claim 2, wherein the size of each sub-frame is dependent on the sampling fraction.

5. The method according to claim 1, wherein the touch panel composes an array of sensor areas and the partial frame is obtained by sampling a sampling fraction of the sensor areas corresponding to a predetermined pattern.

6. The method according to claim 5, wherein the size of each sub-frame is dependent on the sampling fraction.

7. The method according to claim 1, further comprising, for each touch event, in response to a difference between the first location and the second location exceeds a threshold amount, refining or confirming the second location based on the second location and a third location determined based on an additional sub-frame obtained at and around the second location.

8. The method according to claim 1, wherein determining the second location is based on an average of the sub-frame and one or more additional sub-frames, each additional sub-frame obtained at and around the first location.

9. The method according to claim 1, further comprising:
   generating a corrected partial frame by subtracting a reference partial frame from the partial frame, wherein the new frame is reconstructed using the corrected partial frame;
   and in response to detecting no touch events in the new frame;
   generating a new reference partial frame based on exponential smoothing of the reference partial frame and the partial frame; and
   storing the new reference partial frame.

10. The method according to claim 1, wherein the new frame is reconstructed by:
    generating, using a zero-insertion process based on the partial frame, an intermediate frame having the full resolution;
    generating the new frame by filtering the intermediate frame using a spatial low-pass filter having a bandwidth.

11. The method according to claim 10, wherein the bandwidth of the spatial low-pass filter depends on the sampling fraction.

12. The method according to claim 1, wherein the new frame is reconstructed by applying a compressive sensing algorithm to the partial frame.

13. The method according to claim 12, further comprising filtering the new frame using a spatial low-pass filter having a bandwidth before detecting one or more touch events in the new frame.

14. The method according to claim 1, wherein the touch panel comprises an array of sensor areas and each sensor area measures capacitance.

15. The method according to claim 1, wherein the touch panel comprises an array of sensor areas and each sensor area measures force applied proximate to that sensor area.

16. The method according to claim 1, wherein the touch panel comprises an array of sensor areas and each sensor measures capacitance and force applied proximate to that sensor area.

17. An apparatus comprising:
    a touch panel having a full resolution, the touch panel comprising a plurality of sensor areas disposed in an array, each sensor area configured to provide an output signal which varies in response to a touch;
    a frame acquisition module configured to obtain a partial frame having a resolution less than a full resolution of the touch panel;
    a signal reconstruction module configured to reconstruct, based on the partial frame, a new frame having the full resolution;

a touch decision module configured, for each of one or more touch events detected in the new frame, to determine a first location based on the new frame;

a sub-frame acquisition module configured to, for each touch event detected by the touch decision module, determine a second location based on a sub-frame obtained at and around the first location; and, a communications module configured to output one or second locations.

* * * * *